United States Patent [19]
Donnelly et al.

[11] Patent Number: 5,959,481
[45] Date of Patent: Sep. 28, 1999

[54] BUS DRIVER CIRCUIT INCLUDING A SLEW RATE INDICATOR CIRCUIT HAVING A ONE SHOT CIRCUIT

[75] Inventors: Kevin S. Donnelly, San Francisco; Chanh Tran, San Jose; Michael Ching, Sunnyvale; Bruno Garlepp, Mountain View, all of Calif.

[73] Assignee: Rambus Inc., Mountain View, Calif.

[21] Appl. No.: 08/801,521

[22] Filed: Feb. 18, 1997

[51] Int. Cl.$^6$ .................................................... H03K 5/12
[52] U.S. Cl. ........................................ 327/170; 327/172
[58] Field of Search ............................. 327/16, 20, 161, 327/170, 172, 175, 176, 227, 229, 269, 284, 285, 291; 326/32, 27, 87

[56] References Cited

U.S. PATENT DOCUMENTS

| | | | |
|---|---|---|---|
| 4,275,313 | 6/1981 | Boll et al. | 307/448 |
| 4,347,447 | 8/1982 | Proebsting | 307/548 |
| 4,383,216 | 5/1983 | Dorler et al. | 323/282 |
| 4,473,762 | 9/1984 | Iwahashi et al. | 307/594 |

(List continued on next page.)

FOREIGN PATENT DOCUMENTS

| | | |
|---|---|---|
| 0357532 | 7/1989 | European Pat. Off. . |
| 0523833 | 5/1992 | European Pat. Off. . |
| 0547349 | 11/1992 | European Pat. Off. . |
| 0606727 | 12/1993 | European Pat. Off. . |
| 0611053 | 1/1994 | European Pat. Off. . |

OTHER PUBLICATIONS

Wada, et al., "Simple Noise Model and Low–Noise Data–Output Buffer for Ultrahigh–Speed Memories". IEEE Journal of Solid State Circuits, vol. 25., pp. 1586–1588. No. 6, Dec. 1990.

Petrovick Jr, et al., "A 300K–Circuit Asic Logic Family" 1990 IEEE International Solid State Conference Digest of Technical Papers, 4 pages.

Knee, et al., "Programmable Output Pads to Solve System Timing and EMI Problems" Mar. 1992, 9 pages.

R. Senthinathan, et al., "Simultaneous Switching Ground Noise Calculation for Packaged CMOS Devices" IEEE Journal of Solid–State Circuits, vol. 26, No. 11, Nov. 1991, pp. 1724–1728.

Cox, et al., "VLSI Performance Compensation for Off–Chip Drivers and Clock Generation", Proceedings of the IEEE 1989 Custom Integrated Circuits Conference. May 1989, pp. 14.3.1–14.3.4.

C.Kilmer., "Process–Independent Delay Driver" IBM Technical Disclosure Bulletin vol. 23. No. 9 Feb. 1981, pp. 4187–4188.

*Primary Examiner*—Timothy P. Callahan
*Assistant Examiner*—Jung Ho Kim
*Attorney, Agent, or Firm*—Blakely, Sokoloff, Taylor & Zarman LLP

[57] ABSTRACT

A bus driver circuit having slew rate control. According to one embodiment, the bus driver circuit includes the following elements: a first circuit having an input configured to receive a data signal and an output operative to output a drive signal in response to the data signal; a second circuit coupled in parallel with the first circuit and operative to receive a slew rate control signal; and a slew rate indicator circuit coupled to the second circuit. The slew rate indicator circuit determines the state of the slew rate control signal in response to operating conditions that cause variations in the slew rate of the drive signal such that when the slew rate control signal is asserted, the second circuit is enabled to affect the slew rate of the drive signal. For one embodiment, the slew rate indicator includes a pulse generator circuit and a clocked comparator circuit. The pulse generator circuit is operative to receive a clock signal and generate a pulse in response to a first transition of the clock signal. The clocked comparator is coupled to the pulse generator circuit and operative to receive the pulse. The clocked comparator determines the state of the slew rate control signal by sampling for the pulse in response to a second transition of the clock signal.

18 Claims, 14 Drawing Sheets

U.S. PATENT DOCUMENTS

| | | | |
|---|---|---|---|
| 4,477,741 | 10/1984 | Moser, Jr. | 307/473 |
| 4,488,067 | 12/1984 | Kraft et al. | 307/473 |
| 4,494,021 | 1/1985 | Bell et al. | 307/591 |
| 4,531,068 | 7/1985 | Kraft et al. | 307/473 |
| 4,623,805 | 11/1986 | Flora et al. | 307/602 |
| 4,641,048 | 2/1987 | Pollock | 307/591 |
| 4,691,127 | 9/1987 | Huizer | 307/475 |
| 4,713,621 | 12/1987 | Nakamura et al. | 327/269 |
| 4,719,369 | 1/1988 | Asano et al. | 307/443 |
| 4,723,108 | 2/1988 | Murphy et al. | 323/315 |
| 4,760,282 | 7/1988 | Kuo et al. | 307/270 |
| 4,783,714 | 11/1988 | Kalina | 361/101 |
| 4,791,313 | 12/1988 | Kuo et al. | 307/268 |
| 4,791,314 | 12/1988 | Kuo et al. | 307/270 |
| 4,801,825 | 1/1989 | Stanley et al. | 307/443 |
| 4,815,113 | 3/1989 | Ludwig et al. | 377/39 |
| 4,818,901 | 4/1989 | Young et al. | 307/451 |
| 4,825,099 | 4/1989 | Barton | 307/270 |
| 4,874,970 | 10/1989 | Coy et al. | 307/475 |
| 4,877,978 | 10/1989 | Platt | 307/473 |
| 4,877,980 | 10/1989 | Kubinec | 307/542 |
| 4,880,997 | 11/1989 | Steele | 307/443 |
| 4,885,485 | 12/1989 | Leake et al. | 307/542 |
| 4,906,867 | 3/1990 | Petty | 307/443 |
| 4,959,561 | 9/1990 | McDermott et al. | 307/443 |
| 4,962,345 | 10/1990 | Crafts et al. | 307/270 |
| 4,978,905 | 12/1990 | Hoff et al. | 323/314 |
| 4,987,324 | 1/1991 | Wong et al. | 307/451 |
| 5,004,936 | 4/1991 | Andresen | 307/443 |
| 5,008,568 | 4/1991 | Leung et al. | 307/451 |
| 5,013,940 | 5/1991 | Ansel | 307/473 |
| 5,019,720 | 5/1991 | Skoog et al. | 307/270 |
| 5,028,818 | 7/1991 | Go Ang et al. | 307/443 |
| 5,030,855 | 7/1991 | Leung | 307/475 |
| 5,070,256 | 12/1991 | Grondalski | 307/270 |
| 5,086,238 | 2/1992 | Watanabe et al. | 307/296.6 |
| 5,120,992 | 6/1992 | Miller et al. | 307/270 |
| 5,121,000 | 6/1992 | Naghshineh | 307/443 |
| 5,132,564 | 7/1992 | Fletcher et al. | 307/443 |
| 5,148,047 | 9/1992 | Spoher | 307/246 |
| 5,153,457 | 10/1992 | Martin et al. | 307/443 |
| 5,157,282 | 10/1992 | Ong et al. | 307/443 |
| 5,157,285 | 10/1992 | Allen | 307/465 |
| 5,164,611 | 11/1992 | Summe | 307/261 |
| 5,212,801 | 5/1993 | Farmer | 395/800 |
| 5,220,208 | 6/1993 | Schenck | 307/443 |
| 5,223,753 | 6/1993 | Lee et al. | 307/494 |
| 5,229,661 | 7/1993 | Webb | 307/454 |
| 5,233,238 | 8/1993 | Mattos | 307/443 |
| 5,241,221 | 8/1993 | Fletcher et al. | 307/263 |
| 5,247,207 | 9/1993 | Wert et al. | 307/270 |
| 5,248,906 | 9/1993 | Mahmood | 307/443 |
| 5,276,356 | 1/1994 | Shirotori | 307/270 |
| 5,278,464 | 1/1994 | Pelley, III et al. | 307/455 |
| 5,283,631 | 2/1994 | Koerner et al. | 307/451 |
| 5,285,116 | 2/1994 | Thaik | 307/443 |
| 5,291,071 | 3/1994 | Allen et al. | 307/270 |
| 5,306,965 | 4/1994 | Asprey | 307/448 |
| 5,311,077 | 5/1994 | Brown | 307/443 |
| 5,311,084 | 5/1994 | Gabara | 307/491 |
| 5,311,514 | 5/1994 | Cook | 370/85.1 |
| 5,315,173 | 5/1994 | Lee et al. | 327/170 |
| 5,317,206 | 5/1994 | Hanibuchi et al. | 307/443 |
| 5,321,319 | 6/1994 | Mahmood | 307/443 |
| 5,325,258 | 6/1994 | Choi et al. | 361/87 |
| 5,336,940 | 8/1994 | Sorrells et al. | 307/269 |
| 5,336,948 | 8/1994 | Jordan | 307/443 |
| 5,347,177 | 9/1994 | Lipp | 307/443 |
| 5,359,235 | 10/1994 | Coyle et al. | 307/296.1 |
| 5,361,006 | 11/1994 | Cooperman et al. | 326/73 |
| 5,367,210 | 11/1994 | Lipp | 326/26 |
| 5,378,936 | 1/1995 | Kokubo et al. | 327/77 |
| 5,387,882 | 2/1995 | Schoofs | 331/111 |
| 5,408,146 | 4/1995 | Nguyen et al. | 326/86 |
| 5,414,583 | 5/1995 | Jordan | 361/91 |
| 5,430,404 | 7/1995 | Campbell et al. | 327/566 |
| 5,436,887 | 7/1995 | Eisenhuth et al. | 370/24 |
| 5,438,282 | 8/1995 | Kuo | 326/86 |
| 5,440,258 | 8/1995 | Galbi et al. | 327/112 |
| 5,450,019 | 9/1995 | McClure et al. | 326/28 |
| 5,450,026 | 9/1995 | Morano | 326/84 |
| 5,463,337 | 10/1995 | Leonowich | 327/269 |
| 5,473,263 | 12/1995 | Mahmood | 326/27 |
| 5,479,090 | 12/1995 | Schultz | 323/284 |
| 5,487,038 | 1/1996 | Komarek et al. | 365/191 |
| 5,489,862 | 2/1996 | Risinger et al. | 327/108 |
| 5,498,990 | 3/1996 | Leung et al. | 327/202 |
| 5,510,744 | 4/1996 | Lien | 327/310 |
| 5,517,130 | 5/1996 | Sandhu | 326/27 |
| 5,517,136 | 5/1996 | Harris et al. | 326/93 |
| 5,521,540 | 5/1996 | Marbot | 327/170 |
| 5,528,172 | 6/1996 | Sundstrom | 326/80 |
| 5,534,790 | 7/1996 | Huynh et al. | 326/27 |
| 5,534,806 | 7/1996 | Gowni et al. | 327/170 |
| 5,534,809 | 7/1996 | Watanabe et al. | 327/269 |
| 5,537,070 | 7/1996 | Risinger | 327/170 |
| 5,546,039 | 8/1996 | Hewitt et al. | 327/170 |
| 5,546,045 | 8/1996 | Sauer | 327/561 |
| 5,559,447 | 9/1996 | Rees | 326/30 |
| 5,568,075 | 10/1996 | Curran et al. | 327/269 |
| 5,568,081 | 10/1996 | Lui et al. | 327/170 |
| 5,587,679 | 12/1996 | Imamura | 327/170 |
| 5,621,335 | 4/1997 | Andresen | 327/170 |
| 5,677,643 | 10/1997 | Tomita | 327/78 |

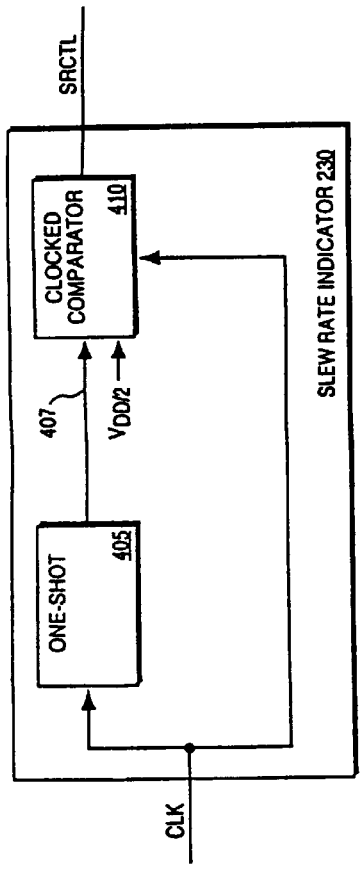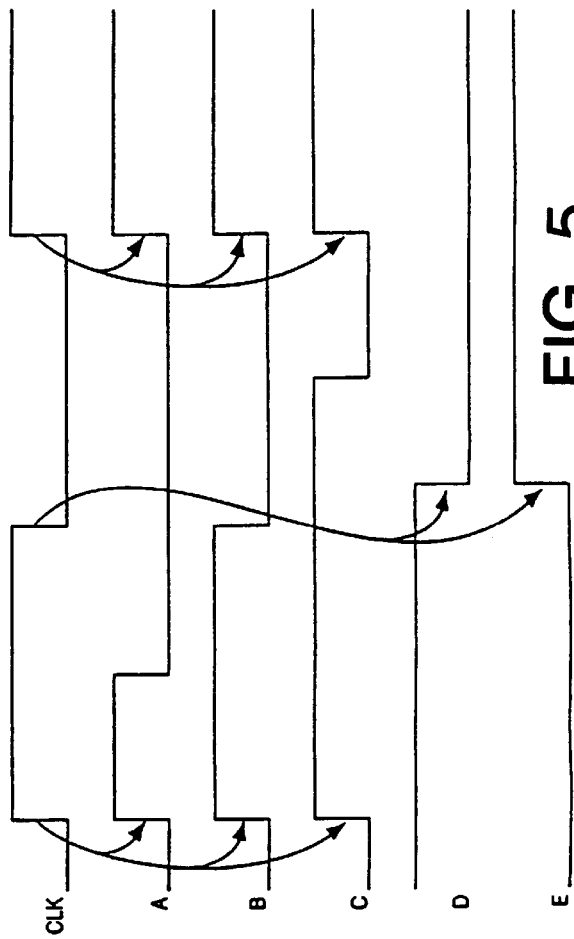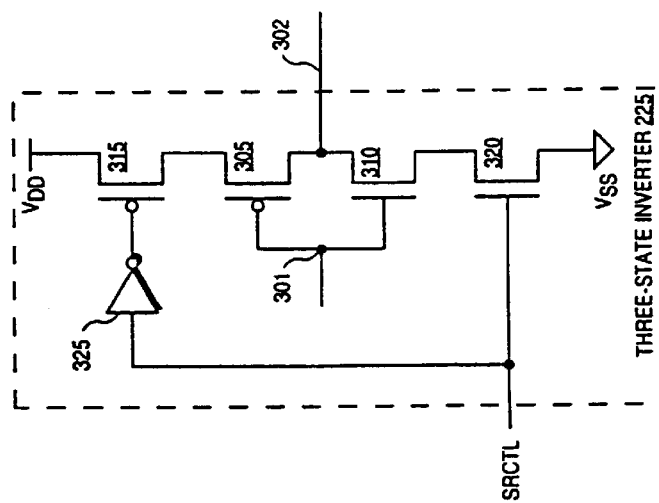

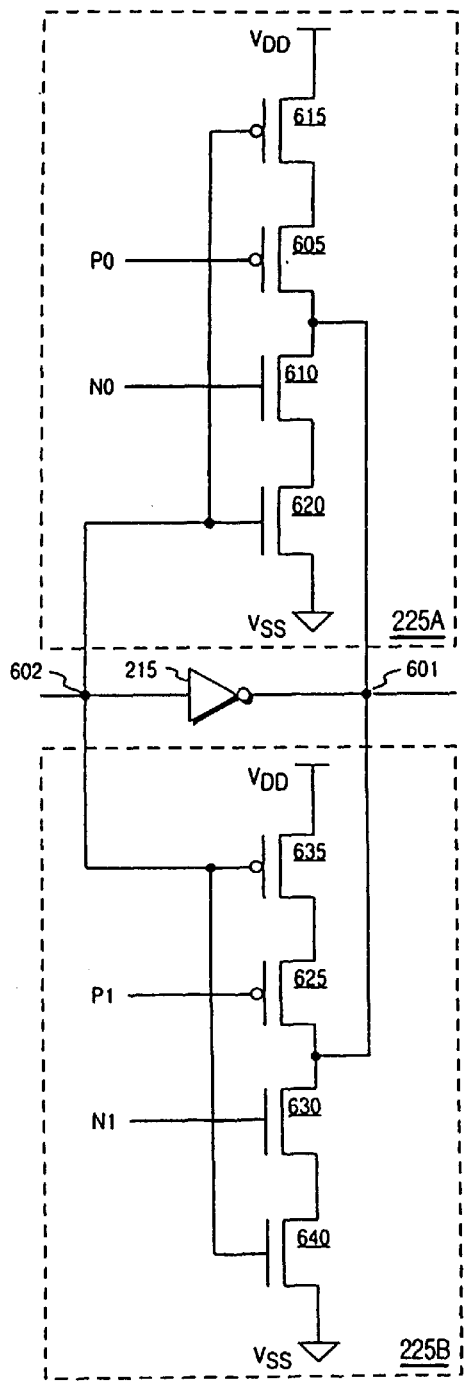
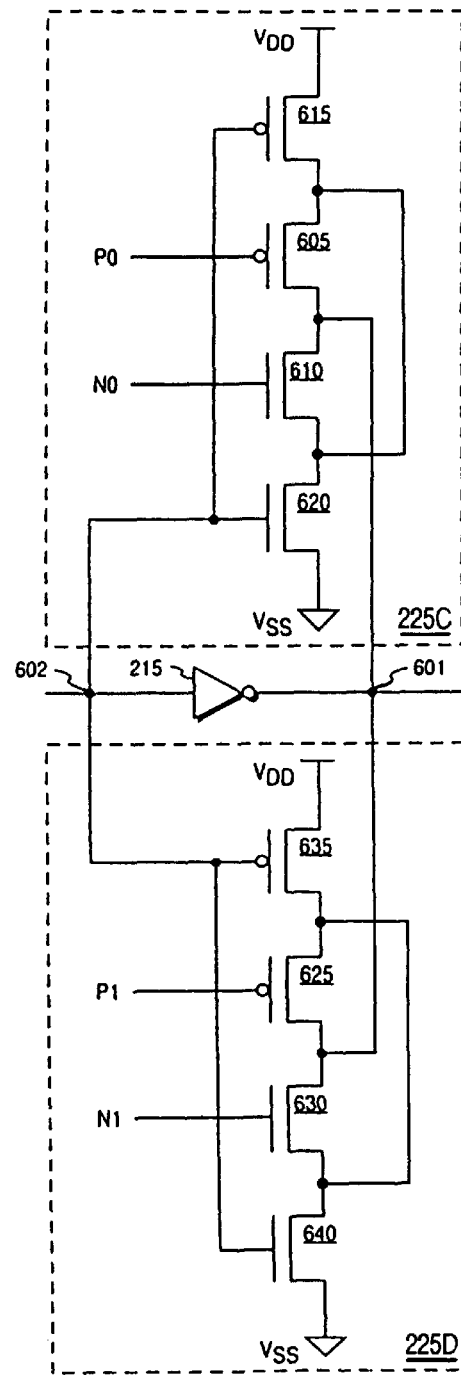
FIG. 6A  FIG. 6B

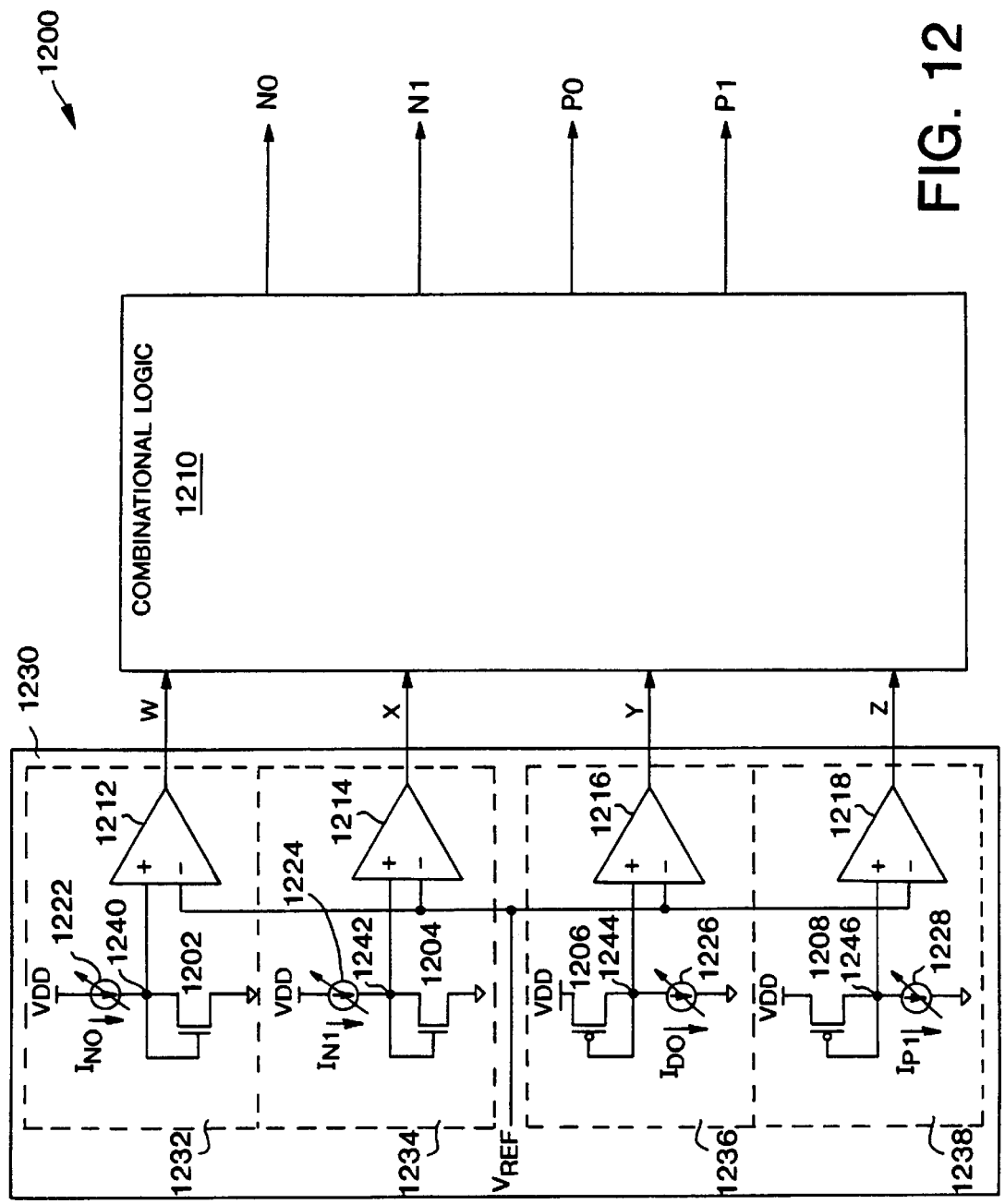

BUS DRIVER CIRCUIT INCLUDING A SLEW RATE INDICATOR CIRCUIT HAVING A ONE SHOT CIRCUIT

CROSS-REFERENCE TO RELATED APPLICATIONS

This application is related to subject matter in U.S. patent application Ser. No. 08/801,522 entitled "BUS DRIVER CIRCUIT INCLUDING A SLEW RATE INDICATOR CIRCUIT HAVING A TUNABLE CURRENT SOURCE", abandoned and U.S. patent application Ser. No. 08/800,541 entitled "BUS DRIVER CIRCUIT INCLUDING A SLEW RATE INDICATOR CIRCUIT HAVING A SERIES OF DELAY ELEMENTS", abandoned. Each of the above referenced applications have the same filing date as this application, and are assigned to the assignee of this application.

FIELD OF THE INVENTION

The present invention relates generally to the field of communication buses and more particularly to a bus driver circuit having slew rate control.

BACKGROUND

A parallel data bus typically comprises a number of bus lines to which the components of a computer system may be connected for communicating information between one another. Each component coupled to the data bus typically includes a set of bus driver circuits for transmitting data via the bus lines by switching the voltages of the bus lines between voltages that correspond to logic states, however defined. The speed at which a bus driver circuit switches the voltages of the bus line between logic states is called the "slew rate," and the slew rate of the bus driver circuit is an extremely important characteristic for ensuring proper operation of the bus driver circuit at the clock speed of the data bus.

FIG. 1 shows a bus driver circuit 100 that operates according to the prior art. Bus driver circuit 100 is shown as comprising NAND gate 105, pass gate 110, inverter 115, and an output buffer 120, which is shown as comprising an n-channel transistor having its source coupled to system ground VSS and its drain coupled to bus line 150. A terminating resistor 125 is shown as being coupled between bus line 150 and a terminating supply voltage $V_{term}$.

NAND gate 105 operates as an input buffer and has a first input coupled to receive a data signal DATA and a second input coupled to receive an enable signal EN. When the EN signal is at a logic high value NAND gate 105 operates as an inverter for inverting the DATA signal to produce an inverted data signal $\overline{\text{DATA}}$. Pass gate 110 is switched on to pass the $\overline{\text{DATA}}$ signal in response to the high level of transmit clock signal TCLK. Inverter 115 receives the $\overline{\text{DATA}}$ signal and inverts it to provide a drive signal DRIVE at the input of output buffer 120. Output buffer 120 is switched on to drive bus line 150 to a low voltage causing the output signal OUT to have a low voltage value when the DRIVE signal is logic high. Output buffer 120 is switched off when the DRIVE signal is a logic low, and the bus line 150 is charged to the terminating voltage $V_{term}$ in response to terminating resistor 125, causing the OUT signal to have a high voltage value.

The slew rate of the output signal OUT is determined by the slew rate of the DRIVE signal. The nominal slew rate of the DRIVE signal is known because the device sizes of inverter 115 are specified to have known values; however, variations in device sizes and device parameters (e.g. gain and threshold voltage) can occur when fabricating a semiconductor device. Therefore, the actual slew rate of the DRIVE signal may vary from the nominal slew rate due to such "process" variations, and the slew rate of the OUT signal is similarly affected. Furthermore, temperature and power supply variations that occur during operation of bus driver circuit 100 can also affect the slew rate. If the actual slew rates of the DRIVE and OUT signals are too much greater than their nominal values, bus driver circuit 100 may induce undesirable ringing on the bus line and voltage transients or "ground bounce" on the supply lines due to, for example, inductance of an integrated circuit package housing bus driver circuit 100 (i.e., inductance due to bond wires, the lead frame, etc.). If the actual slew rate of the DRIVE and OUT signals are too much less than their nominal values, bus driver circuit 100 may not be able to reliably operate at the frequency of the bus clock. The ability to control slew rate variations of a bus driver circuit is therefore desirable.

SUMMARY AND OBJECTS OF THE INVENTION

Therefore, it is an object of the present invention to provide a bus driver circuit having slew rate control.

These and other objects are met by a bus driver circuit arrangement that adjusts the slew rate of the bus driver circuit when operating conditions indicate unacceptable slew rate variations. According to one embodiment, the bus driver circuit includes the following elements: a first circuit having an input configured to receive a data signal and an output operative to output a drive signal in response to the data signal; a second circuit coupled in parallel with the first circuit and operative to receive a slew rate control signal; and a slew rate indicator circuit coupled to the second circuit. The slew rate indicator circuit determines the state of the slew rate control signal in response to operating conditions that cause variations in the slew rate of the drive signal such that when the slew rate control signal is asserted, the second circuit is enabled to affect the slew rate of the drive signal.

For one embodiment, the slew rate indicator includes a pulse generator circuit and a clocked comparator circuit. The pulse generator circuit is operative to receive a clock signal and generate a pulse in response to a first transition of the clock signal. The clocked comparator is coupled to the pulse generator circuit and operative to receive the pulse. The clocked comparator determines the state of the slew rate control signal by sampling for the pulse in response to a second transition of the clock signal.

Other objects, features, and advantages of the present invention will be apparent from the accompanying drawings and from the detailed description which follows below.

BRIEF DESCRIPTION OF THE DRAWINGS

The features and advantages of the present invention are illustrated by way of example and are by no means intended to limit the scope of the present invention to the particular embodiments shown, and in which:

FIG. 3 shows a three-state inverter according to one embodiment;

FIG. 4 shows a slew rate indicator circuit of one embodiment;

FIG. 5 is a timing diagram that illustrates the manner of operation for the slew rate indicator of FIG. 4 according to one embodiment;

FIG. 6A shows an alternative embodiment wherein two three-state inverters are provided in place of the single three-state inverter shown in FIG. 2;

FIG. 6B shows another embodiment wherein two three-state inverters are provided in place of the single three-state inverter shown in FIG. 2;

FIG. 12 shows another embodiment of a slew rate indicator circuit including a PVT code generator and combinational logic;

DETAILED DESCRIPTION

An improved bus driver circuit is disclosed including a slew rate indicator circuit and a three-state inverter which are used to correct or adjust the slew rate of the bus driver circuit in response to changes in operating conditions (e.g., process, temperature, and power supply variations) that cause the slew rate to increase or decrease to an unacceptable rate. The improved bus driver circuit may drive a bus line or any other signal line. According to one embodiment, the slew rate indicator is manufactured on the same semiconductor substrate according to the same process as the remainder of the bus driver circuit. The slew rate indicator is therefore subject to the same process variations and operating environment as the remainder of the bus driver circuit. This enables the slew rate indicator to track and compensate for slew rate variations as they occur. Thus, as will be described, the range of values across which the slew rate of bus driver circuit may vary is reduced.

Figure 2:
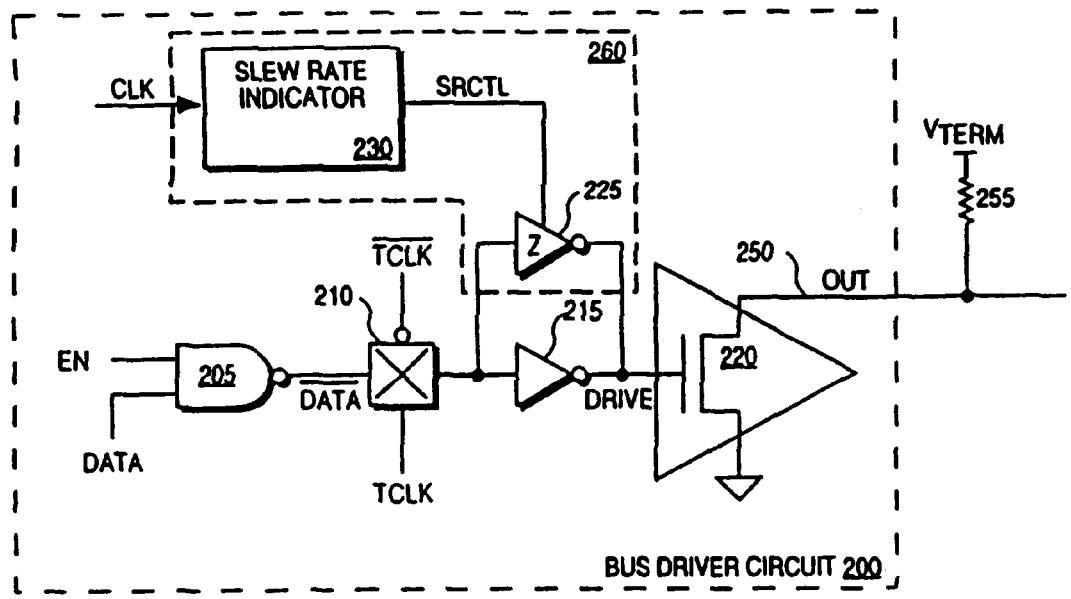
FIG. 2 shows an improved bus driver circuit according to one embodiment.

FIG. 2 shows an improved bus driver circuit 200 according to one embodiment. Bus driver circuit 200 generally comprises NAND gate 205, pass gate 210, inverter 215, output buffer 220, and slew rate control circuit 260. Slew rate control circuit 260 includes slew rate indicator 230 and a pre-driver circuit, namely three-state inverter 225.

Figure 1:
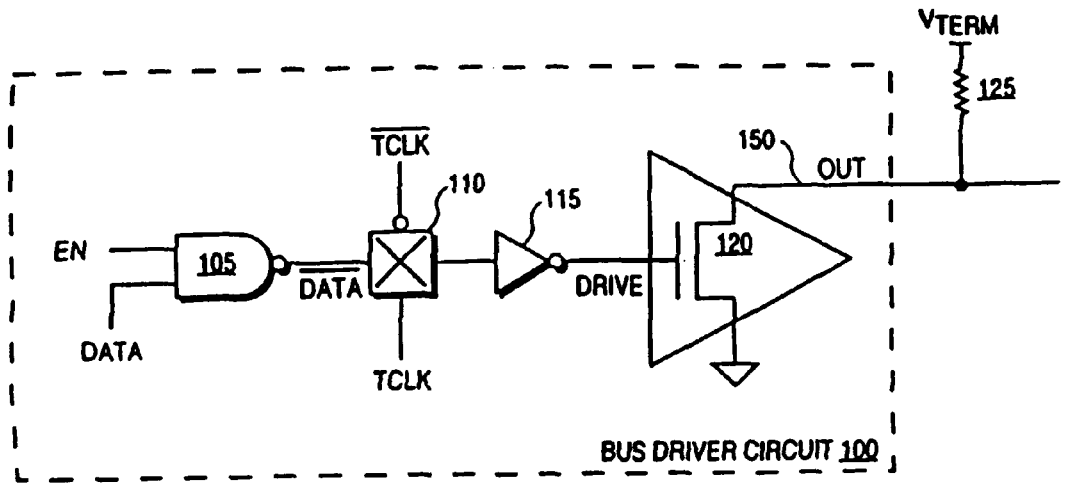
FIG. 1 shows a bus driver circuit that operates according to the prior art.

According to the embodiment of FIG. 2, output buffer 220 comprises an n-channel transistor having its source coupled to system ground VSS, its drain coupled to bus line 250, and its gate coupled to receive a DRIVE signal from inverters 215 and 225. Output buffer 220 may alternatively comprise an inverter wherein the output of the inverter sets the voltage of bus line 250. Terminating resistor 255 may not be required when output buffer 220 comprises an inverter. With the exception of slew rate control circuit 260, bus driver circuit 200 operates in substantially the same manner as bus driver circuit 100 shown in FIG. 1.

Slew rate control circuit 260 receives clock signal CLK and affects the slew rate of the DRIVE signal output by inverter 215, and the OUT signal on bus line 250 in response to variations in the operating conditions of bus driver circuit 200. As will be described in more detail below, when operating conditions (e.g., process parameters, operating temperature, operating voltage, etc.) cause the slew rate of the DRIVE signal to decrease to a predetermined rate, then slew rate control circuit 260 increases the slew rate of the DRIVE signal and consequently the slew rate of the OUT signal. The slew rates of the DRIVE and OUT signals are adjusted without the use of a feedback connection from the DRIVE or OUT signal to slew rate control circuit 260.

Three-state inverter 225 is coupled in parallel with inverter 215 and is provided to increase the slew rate of the DRIVE signal by providing more current if the actual slew rate of the DRIVE signal would otherwise be slower than the nominal slew rate. Three-state inverter 225 is disabled if the actual slew rate of the DRIVE signal is greater than or equal to the nominal slew rate. Inverter 215 may be designed so that the slew rate of the DRIVE signal is not too fast under worst case operating conditions (e.g., fast process parameters, cold operating temperatures, high operating voltages) when three-state inverter 225 disabled. A digital slew rate control signal SRCTL output by slew rate indicator 230 is provided to enable and disable three-state inverter 225.

Slew rate indicator 230 may be considered a process-voltage-temperature or "PVT" detector circuit. Slew rate indicator 230 is provided to indicate whether variations in the fabrication process (e.g., transistor dimensions, dielectric dimensions, thresholds, gain, etc.), supply voltage, input voltage, or operating temperature result in variations in the slew rate of the DRIVE or OUT signals of bus driver circuit 200. If slew rate indicator 230 indicates that variations in operating or PVT conditions would otherwise cause the slew rate of the DRIVE or OUT signal to be too slow, slew rate indicator 230 causes the SRCTL signal to enable three-state inverter 225. If slew rate indicator 230 indicates that operating or PVT conditions may cause the slew rate of the DRIVE or OUT signal to be equal to or faster than the nominal slew rate, slew rate indicator 230 causes the SRCTL signal to disable three-state inverter 225. Because the slew rate of bus driver circuit 200 is prevented from being too slow, the range of values across which the actual slew rate of the DRIVE or OUT signal may vary is reduced. For one embodiment, the range is reduced to approximately one-half the range without slew rate indicator 230 and three-state inverter 225.

According to alternative embodiments, three-state inverter 225 and inverter 215 may be replaced with noninverting buffers and bus driver circuit 200 may be adjusted as generally known in the art.

Slew rate control circuit 260 may influence the slew rates of the rising or falling edge transitions of the DRIVE signal and the OUT signal. For one embodiment, slew rate control circuit 260 may cause the slew rates of the rising and falling edges of the OUT signal to increase by 30–40% at the slowest operating corner (e.g., slow process parameters, high operating temperatures such as 130° C., and low operating voltages such as 2.9 V). For other embodiments, three-state inverter 225 may be sized to produce any desired increase in the slew rates of either the rising or falling edge of the OUT signal.

For another embodiment, the slew rates of the rising and falling edges of the OUT signal of bus driver circuit 100 at the slowest operating corner (e.g., slow process parameters, high operating temperatures such as 130° C., and low operating voltages such as 2.9 V) may be approximately three times slower than the slew rates of the rising and falling edges of the OUT signal at the fastest operating corner (e.g., fast process parameters, cold operating temperatures such as 25° C., and high operating voltages such as 3.7 V). In contrast, the slew rates of the rising and falling edges of the OUT signal of bus driver circuit 200 at the slowest operating corner may be approximately 1.5 times slower than the slew rates of the rising and falling edges of the OUT signal at the fastest operating corner. Therefore, there may be an approximately 2× improvement in the comparison between the slew rates of the rising and falling edges at the fast and slow operating corners using slew rate control circuit 260.

Slew rate control circuit 260 may also affect the duty cycle of the DRIVE signal and consequently the OUT signal. The duty cycle may be altered by designing three-state inverter 225 to asymmetrically influence the slew rate of either the rising edge or the falling edge of the DRIVE or OUT signal in response to particular PVT operating conditions. This will be described in more detail below.

The duty cycle of the OUT signal may vary with PVT operating conditions. Slew rate control circuit 260 may decrease this variability by appropriately controlling three-state inverter 225. For one embodiment, the variability of the duty cycle of the OUT signal of bus driver circuit 200 between the slowest operating corner and the fastest operating corner may be reduced approximately 1.5 to 2.0 times over the OUT signal of bus driver circuit 100. Additionally, the duty cycle error (i.e., actual duty cycle relative to a 50% duty cycle) of the OUT signal of bus driver circuit 200 may be decreased over the OUT signal of bus driver circuit 100. Furthermore, the duty cycle of the OUT signal of bus driver circuit 200 may be centered about a desired 50% duty cycle across PVT operating conditions.

FIG. 3 shows three-state inverter 225 according to one embodiment. Three-state inverter 225 generally includes a CMOS pair of transistors comprising p-channel transistor 305 and n-channel transistor 310 having their gates coupled to an input node 301 for receiving the $\overline{\text{DATA}}$ signal and their drains coupled to an output node 302 for strengthening the DRIVE signal when three-state inverter 225 is enabled. According to one embodiment, transistors 305 and 310 are approximately the same size as the respective devices of the CMOS transistor pair of inverter 215.

Three-state inverter 225 further includes a three-state transistor pair comprising a p-channel transistor 315, which is coupled between the source of p-channel transistor 305 and the operating supply voltage VDD, and an n-channel transistor 320, which is coupled between the source of n-channel transistor 310 and system ground VSS. As shown, slew rate control signal SRCTL is coupled directly to the gate of n-channel transistor 320, and an inverter 325 is provided for supplying an inverted SRCTL signal to the gate of p-channel transistor 315. Alternatively, SRCTL may be coupled directly to the gate of p-channel transistor 315 and inverter 325 may be provided for supplying an inverted SRCTL signal to the gate of n-channel transistor 320.

When SRCTL has a logic low value, transistors 315 and 320 are switched off, removing the supply voltages from the drains of transistors 305 and 310. In this manner, three-state inverter 225 presents a high impedance to output node 302 and is prevented from affecting the slew rate of the DRIVE signal. When SRCTL has a logic high value, transistor 315 and 320 are switched on, and three-state inverter 225 is enabled to operate as a normal CMOS inverter. Thus, when SRCTL is a logic high value, three-state inverter 225 may affect the slew rate of the DRIVE signal and consequently the slew rate of the OUT signal.

According to alternative embodiments, a slew rate indicator circuit may not be required. For example, a fuse may be inserted between VDD and the SRCTL signal line, and the fuse may be blown if an increased slew rate is not required. Other known types of programmable elements (e.g., nonvolatile memory bits) besides a fuse may also be used.

FIG. 4 shows one embodiment of slew rate indicator circuit 230 including one-shot circuit 405 coupled in series with clocked comparator circuit 410. One-shot circuit 405 is configured to generate a pulse in response to detecting a rising edge of a reference clock signal CLK, which is provided at the input of one-shot circuit 405. Under normal operating conditions, one-shot circuit 405 is designed to generate a pulse having a nominal pulse width that is approximately equal to half of the period of the reference clock signal CLK. One-shot circuit 405 may have any appropriate CMOS architecture, and other pulse generating circuits may alternatively be used.

Clocked comparator circuit 410 has a first input coupled to output 407 of one-shot circuit 405, a second input coupled to a reference voltage, and an enable input coupled to the reference clock signal CLK. According to the embodiment of FIG. 4, the reference voltage is equal to one-half of the operating supply voltage VDD. Clocked comparator circuit 410 is enabled to compare the output of one-shot circuit 405 to the reference voltage upon detecting a falling edge of the reference clock signal CLK.

FIG. 5 is a timing diagram showing the manner of operation for a slew rate indicator according to one embodiment under various operating conditions. As previously described, one-shot circuit 405 generates a pulse for each rising edge of the reference clock signal, and the nominal pulse width of the pulse output from one-shot circuit 405 is equal to approximately one-half the period of the reference clock signal CLK. Because one-shot circuit 405 is manufactured using the same process as the remainder of bus driver circuit 200 and because one-shot circuit 405 is operating in the same environment as the remainder of bus driver circuit 200, the width of the pulse generated by one-shot signal 405 on output 407 varies with process, temperature, and supply voltage variations, and the pulse width of the pulse output by one-shot circuit 405 substantially tracks the slew rate of the DRIVE signal and the OUT signal. For example, when a short pulse width occurs at output 407, the output slew rate will be faster than the nominal slew rate. For one embodiment, a short pulse occurs when bus driver circuit 200 circuit is operating under fast operating conditions (e.g., fast process parameters, cold operating temperatures, and/or high operating voltages). Similarly, when a long pulse width occurs at output 407, the slew rate of the DRIVE signal and the OUT signal will be slower than the nominal stew rate. For one embodiment, a long pulse occurs when bus driver circuit 200 circuit is operating under slow operating conditions (e.g., slow process parameters, hot operating temperatures, and/or low operating voltages). Clocked comparator 410 samples the PVT sensitive pulse on output 407 upon detecting a falling edge of CLK.

FIG. 5 shows a reference clock waveform CLK, an "A" waveform indicative of a fast slew rate wherein the width of the pulse is less than half the period of CLK, a "B" waveform indicative of a typical slew rate wherein the width of the pulse is approximately equal to half the period of CLK, a "C" waveform indicative of slow slew rate wherein the width of the pulse is more than half the period of CLK, a "D" waveform indicative of the SRCTL signal generated in response to waveforms A or B and CLK, and an "E" waveform indicative of the SRCTL signal generated in response to waveform C and CLK. Waveforms A–C are taken from output 407 of one-shot circuit 405, as shown in FIG. 4.

If one-shot circuit 405 outputs the pulse shown by waveform A, clocked comparator circuit 410 detects the output of one-shot circuit 405 as being a logic low voltage at the falling edge of CLK, and clocked comparator circuit 410 deasserts the SRCTL signal to a logic low value as indicated by waveform D. Three-state inverter 225 is thus disabled, and inverter 215 alone determines the slew rate of the DRIVE and OUT signals of bus driver circuit 200.

If one-shot circuit 405 outputs the pulse shown by waveform B, the falling edge of the pulse output by one-shot circuit 405 approximately matches the falling edge of reference clock signal, and the output of clocked comparator circuit 410 may become metastable because the voltage of the pulse may be indeterminate. A positive feedback connection may be placed between the output of clocked comparator 410 and the input of clocked comparator 410 coupled to node 407 to reduce the duration of metastability. Other techniques may be used to reduce the duration of metastability or eliminate the metastable condition.

If one-shot circuit 405 outputs the pulse shown by waveform C, clocked comparator circuit 410 detects the output of one-shot circuit 405 as being a logic high voltage at the falling edge of CLK, and clocked comparator circuit 410 asserts the SRCTL signal to a logic high value as indicated by waveform E. Three-state inverter 225 is thus enabled to strengthen the output current of the DRIVE signal and increase the slew rate of DRIVE and OUT signals of bus driver circuit 200.

Care must be taken to ensure that the state of the SRCTL signal does not change when data is being driven by bus driver circuit 200. Wherein slew rate indicator 230 can operate continuously to track environmental changes, the SRCTL signal should be updated only when no data is being transmitted. This may be done, for example, by supplying the enable signal EN shown in FIG. 2 to clocked comparator circuit 410 to prevent clocked comparator circuit 410 from sampling the output of one-shot circuit 405 when the enable signal EN is active high. A latch may be supplied at the output of clocked comparator circuit 410 for latching the value of the SRCTL signal and for supplying the SRCTL signal when clocked comparator circuit 410 is disabled.

The range of values across which the slew rate of bus driver circuit 200 may vary may be further decreased by providing any number of additional three-state inverters and slew rate indicator circuits. For example, separate control signals may be provided to individually control the NMOS and PMOS devices of three-state inverter 225.

The n-channel and p-channel transistors of a CMOS circuit are typically fabricated using different process steps. Therefore, each of the n-channel and p-channel transistors may be independently subject to different process variations. Thus, the p-channel transistors may be slow (i.e., the p-channel transistors may source less current than expected) when the n-channel transistors are fast (i.e., the n-channel transistors may sink more current than expected), and the n-channel transistors may be slow when the p-channel transistors are fast. The arrangements illustrated by FIGS. 2–5 generally correct for a reduced slew rate without regard to whether it is the n-channel transistors or the p-channel transistors that are responsible for the reduced slew rate.

FIG. 6A shows an alternative embodiment wherein two pre-driver circuit, namely three-state inverters 225A and 225B are provided in place of the single three-state inverter 225 shown in FIG. 2. Each of three-state inverters 225A and 225B are controlled independently of one another by slew rate indicator circuit 700 shown in FIG. 7. In this manner, slew rate variations due to n-channel process steps and p-channel process steps may be separately addressed. The three-state inverters of FIG. 6A may be configured to increase the slew rate of the DRIVE signal, if required. Accordingly, inverter 215 (FIG. 2) may be selected to provide the slowest desirable slew rate, and the n-channel and p-channel devices of three-state inverters 225A and 225B may be switched on if the slew rate indicator circuit of FIG. 7 determines that an increased slew rate is required.

Alternatively, three-state inverter 225A (or 225B) may be configured to be enabled when the slew rate of the DRIVE signal is in a nominal or typical range. For this alternative embodiment, if slew rate indicator 700 indicates that operating or PVT conditions cause the slew rate of the DRIVE signal to increase beyond an acceptable amount, then three-state inverter 225A may be disabled. Alternatively, the p-channel or n-channel transistors of three-state inverter 225A (or 225B) may be individually disabled.

For yet another alternative embodiment, three-state inverter 225A (or 225B) may be configured to be enabled while the three-state inverter 225B (or 225A) may be configured to be disabled when the slew rate of the DRIVE signal is in a nominal or typical range. For this alternative embodiment, if slew rate indicator 700 indicates that operating or PVT conditions cause the slew rate of the DRIVE signal to increase beyond an acceptable amount, then three-state inverter 225A may be disabled. If slew rate indicator 700 indicates that operating or PVT conditions cause the slew rate of the DRIVE signal to decrease beyond an acceptable amount, then three-state inverter 225B may be enabled. Alternatively, only the p-channel of n-channel transistors of three-state inverters 225A or 225B may be individually enabled or disabled.

Three-state inverter 225A comprises p-channel transistor 605, n-channel transistor 610, p-channel transistor 615, and n-channel transistor 620. Transistors 605 and 610 have their drains coupled in common to an output node 601 to supplement the DRIVE signal output by inverter 215, when enabled. As shown, the gates of transistors 605 and 610 are independently controlled by slew rate control signals P0 and N0, respectively. Transistor 615 has its drain coupled to the source of transistor 605, its source coupled to operating supply voltage VDD, and its gate coupled to input node 602 for receiving the $\overline{\text{DATA}}$ signal. Transistor 620 has its drain coupled to the source of transistor 610, its source coupled to system ground VSS, and its gate coupled to input node 602 for receiving the $\overline{\text{DATA}}$ signal.

Three-state inverter 225B comprises p-channel transistor 625, n-channel transistor 630, p-channel transistor 635, and n-channel transistor 640. Transistors 625 and 630 have their drains coupled in common to output node 601 to supplement the DRIVE signal output by inverter 215, when enabled. As shown, the gates of transistors 625 and 630 are independently controlled by slew rate control signals P1 and N1, respectively. Transistor 635 has its drain coupled to the source of transistor 625, its source coupled to operating supply voltage VDD, and its gate coupled to input node 602 for receiving the $\overline{\text{DATA}}$ signal. Transistor 640 has its drain coupled to the source of transistor 630, its source coupled to system ground VSS, and its gate coupled to input node 602 for receiving the $\overline{\text{DATA}}$ signal.

Any combination of transistors 605, 610, 625, and 630 may be enabled by slew rate control signals P0, N0, P1, and N1, respectively, to increase (or decrease) the DRIVE signal output by inverter 225, including enabling only or all of transistors 605, 610, 625, or 630. The slew rate control signals P0, N0, P1, and N1, may be termed a "slew rate control code" or "SRC code".

Transistors 605, 610, 625, and 630 may be sized (e.g., width and length dimensions) to approximately source or sink the same or different amounts of current as corresponding transistors in inverter 215. Alternatively, each of transistors 605, 610, 625, and 630 may be sized to source or sink different amounts of current. For example, transistors P0 and P1 may be sized to increase (or decrease) the amount of current sourced to the DRIVE signal in a geometric manner (e.g., in a pattern of 1×, 2×, 4×, etc. of the current supplied by inverter 215. Similarly, transistors N0 and N1may be sized to increase (or decrease) the amount of current sourced to the DRIVE signal in a geometric manner.

Figure 7:
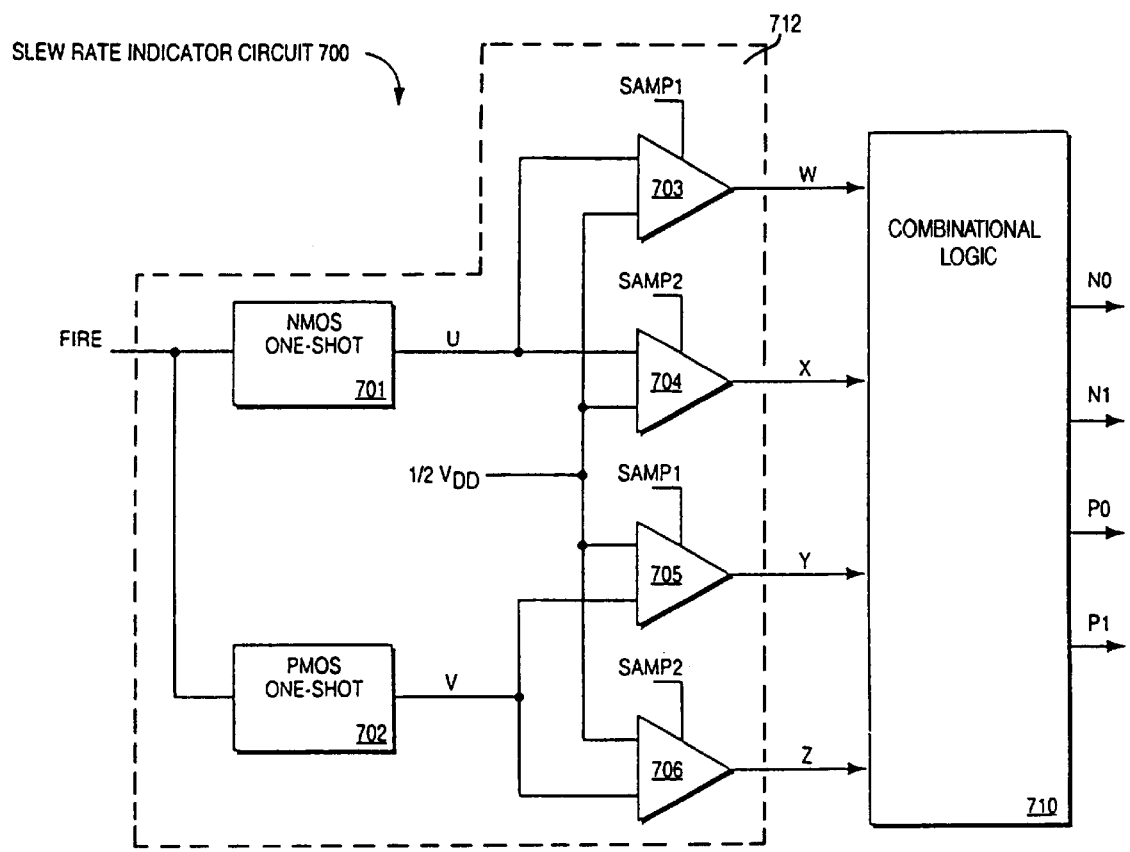
FIG. 7 shows one embodiment of a slew rate indicator circuit for controlling the three-state inverters of FIG. 6A.

FIG. 7 shows a slew rate indicator circuit 700 for controlling inverters 225A and 225B shown in FIG. 6A. Slew rate indicator circuit 700 includes a PVT code generator circuit 712 that includes NMOS one-shot circuit 701, PMOS one-shot circuit 702, clocked comparator circuits 703–706, and combinational logic 710. Slew rate indicator circuit 700 may be a PVT detector circuit that generates a PVT code represented by signals W, X, Y, and Z which may be translated by combinational logic 710 to an SRC code represented by signals N0, N1, P0, and P1. Changes in operating or PVT conditions may cause changes in the PVT code.

Generally, PVT code generator circuit 712 is a sampling circuit that receives the FIRE signal and generates PVT sensitive pulses U and V. Pulses U and V are then sampled by clocked comparators 703–706 in response to sampling signals SAMP1 and SAMP2 generated at predetermined delays from the FIRE signal. Providing more sample points and/or sample signals may increase the resolution of the PVT code generated by PVT code generator circuit 712.

NMOS one-shot circuit 701 outputs pulse U in response to detecting the rising edge of the FIRE signal. PMOS one-shot circuit 702 outputs pulse V in response to detecting the rising edge of the FIRE signal.

According to one embodiment, NMOS one-shot circuit 701 is manufactured entirely of n-channel transistors for detecting process variations for n-channel devices independently of the p-channel process. Similarly, PMOS one-shot circuit 702 may be manufactured entirely of p-channel transistors for detecting process variations for p-channel devices independently of the n-channel process.

Clocked comparators 703 and 704 are coupled to the output of NMOS one-shot circuit 701, and clocked comparators 705 and 706, coupled to the output of PMOS one-shot circuit 702. Clocked comparators 703–706 compare VDD/2, or any other reference voltage, with either U or V and generate the PVT code as signals W–Z. Clocked comparator 703 is enabled to sample the output of NMOS one-shot circuit 701 in response to the falling edge of a SAMP1 signal and outputs the W signal; clocked comparator 704 is enabled to sample the output of NMOS one-shot circuit 701 in response to the falling edge of a SAMP2 signal and outputs the X signal; clocked comparator 705 is enabled to sample the output of PMOS one-shot circuit 702 in response to the falling edge of a SAMP1 signal and outputs the Y signal; and clocked comparator 706 is enabled to sample the output of PMOS one-shot circuit 702 in response to the falling edge of a SAMP2 signal and outputs the Z signal.

Combinational logic 710 translates the PVT codes produced by PVT code generator 712 as signals W–Z into appropriate SRC codes (signals N0, N1, P0, and P1) for enabling or disabling transistors 605, 610, 625, and 630 in order to maintain the output slew rate of the DRIVE or OUT signal within desirable limits. For one embodiment, a change in the PVT code due to changes in PVT operating conditions would cause a corresponding change in the SRC code. For example, the W–Z signals may be directly mapped to the N0–N1 and P0–P1 control signals as follows: N0 is coupled to W; N1is coupled to X; P0 is coupled to the logical inverse of Y; and P1 is coupled to the logical inverse of Z. For this embodiment, combinational logic 710 may simply comprise inverters for inverting Y and Z.

Given that PVT code generator circuit 712 does not directly measure the slew rate of the DRIVE or OUT signal, the PVT codes may not always map to the SRC codes as described above. By simulating or characterizing many of the possible PVT conditions, it may be determined that there are situations in which having the PVT codes directly map to the SRC codes would lead to undesirable slew rates of either the rising or falling edges of the DRIVE or OUT signal, or to undesirable duty cycles of the DRIVE or OUT signal. Therefore, combinational logic 710 can be designed to process the PVT codes and generates desirable SRC codes, that is, the PVT codes generated under certain PVT operating conditions may be re-mapped or error-corrected to desirable SRC codes by combinational logic 710. Implementations of more complicated mapping using combinational logic 710 are discussed below with respect to FIGS. 11A and 11B.

According to the present embodiment, the FIRE, SAMP1, and SAMP2 signals are pulses generated by a synchronous counter or a control circuit (not shown) that operates in response to the reference clock signal CLK. This allows the generation and pulse widths of the FIRE, SAMP1 and SAMP2 signals to be accurately controlled. According to one embodiment, the pulse width of the FIRE signal is longer than that of the SAMP2 signal, which is longer than that of the SAMP1 signal. The NMOS and PMOS one-shot circuits 701 and 702 are designed such that the falling edges of U and V will typically fall within a window defined by the falling edges of the SAMP1 and SAMP2 signals for nominal process conditions.

For another embodiment, the SAMP1 and SAMP2 signals may have different pulse widths than that described above.

For example, SAMP1 and/or SAMP2 may have a pulse width of one or more clock (CLK) cycles which may occur at predetermined delays after the FIRE signal has been asserted. Clocked comparators 703–706 may sample the U and V pulses in response to either the rising edge or the falling edge of the SAMP1 or SAMP2 signals.

Figure 8:
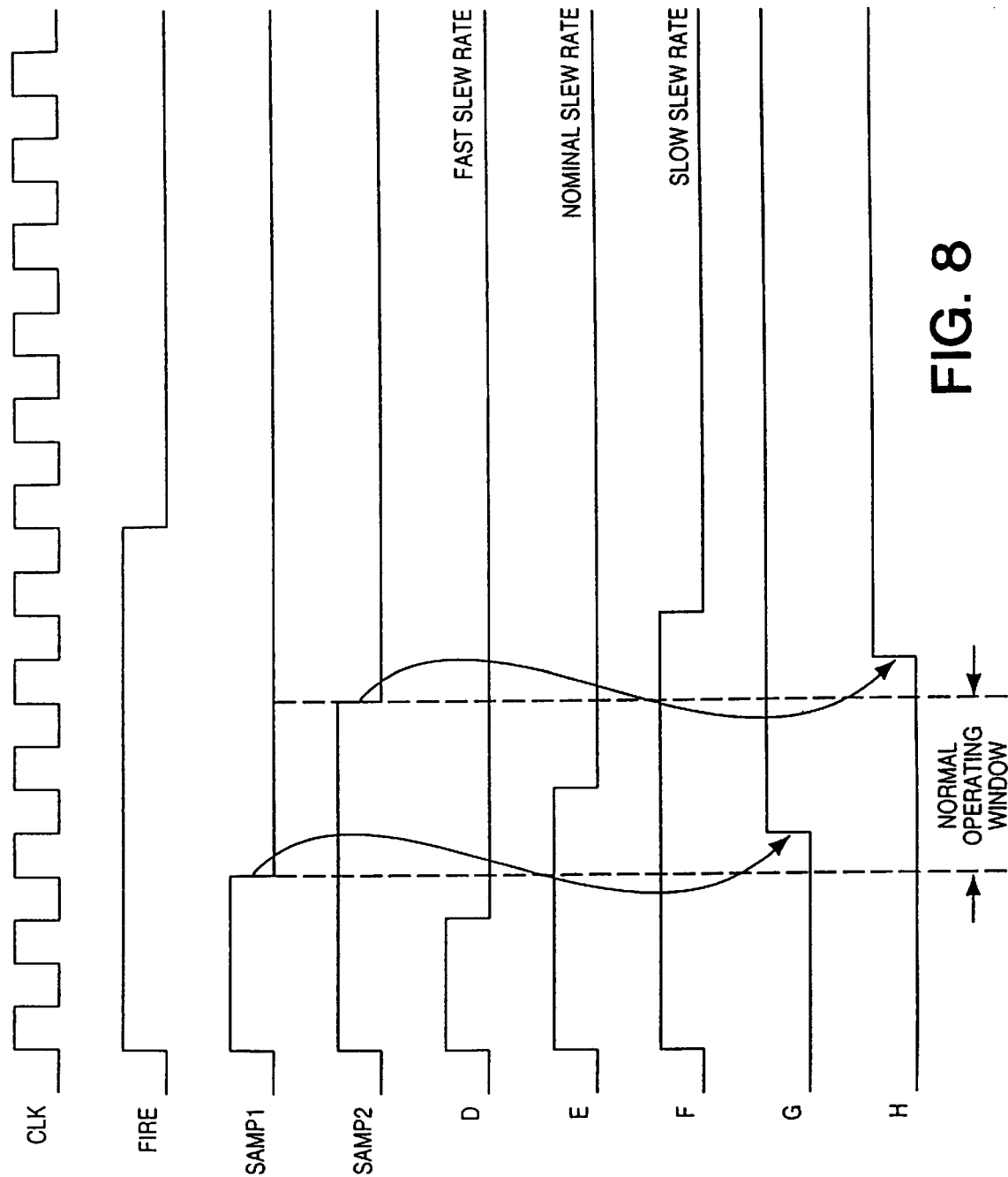
FIG. 8 is a timing diagram that illustrates the relationship between the clock and sampling signals of one embodiment of FIG. 7 and also shows waveforms "D," "E,", "F", "G" and "H"

FIG. 8 shows waveforms CLK, FIRE, SAMP1 SAMP2, "D," "E," "F", "G", and "H". Waveform D indicates a fast slew rate indicative of fast operating conditions (e.g., fast process parameters, cold operating temperatures, and/or high operating voltages). Waveform E indicates a normal/nominal slew rate indicative of normal operating conditions (e.g., nominal process parameters, nominal operating temperatures, and/or nominal operating voltages). Waveform F indicates a slow slew rate indicative of slow operating conditions (e.g., slow process parameters, hot operating temperatures, and/or low operating voltages). Waveforms D–F represent possible outputs U and V from NMOS and PMOS one-shot circuits 701 and 702, respectively. The nominal pulse width of waveform E may span multiple clock periods of reference clock signal CLK. For one embodiment, waveform E spans approximately eight (8) clock periods of reference clock signal CLK.

Clocked comparators 703–706 are enabled to sample the outputs of their corresponding one-shot circuits at the falling edge of either the SAMP1 or SAMP2 signals. By comparing waveforms D–F to the falling edges of the SAMP1 and SAMP2 signals, the following observations are made: 1) the pulse of waveform D will be detected as a logic low by comparators clocked by either the SAMP1 or SAMP2 signal; 2) the pulse of waveform E will be detected as a logic high by a comparator clocked by the SAMP1 signal and as a logic low by a comparator clocked by the SAMP2 signal; and 3) the pulse of waveform F will be detected as a logic high by comparators clocked by either the SAMP1 or SAMP2 signal.

Waveform G corresponds to one embodiment of signal W output by comparator 703 or signal Y output by comparator 705 in response to waveforms E or F. For example, waveform G will transition to a high level if waveforms U or V are a high level at the falling edge of SAMP1 that is, when either waveform E or F is high at the falling edge of SAMP1. Waveform H corresponds to one embodiment of signal X output by comparator 704 or signal Z output by comparator 706 in response to waveform F. For example, waveform H will transition to a high level if waveforms U or V are a high level at the falling edge of SAMP2, that is, when waveform F is high at the falling edge of SAMP2.

FIG. 8 illustrates, for example, that if operating or PVT conditions indicate that the slew rate of the DRIVE signal is slower than desired, then the PVT code generated by PVT code generator 712 as signals W–Z will be 1111. Combinational logic 710 may then translate this PVT code into an SRC code equal to 1100 for signals N0, N1, P0, and P1, respectively. This will cause three-state inverters 225A and 225B to be enabled to increase the slew rate of the DRIVE signal.

As previously discussed with respect to FIG. 6A, the PVT code generated by PVT code generator 712 and the translation performed by combinational logic 710 may be altered such that one or both of three-state inverters 225A or 225B is enabled or disabled when a slew rate other than a nominal slew rate of the DRIVE signal is indicated by the given PVT operating conditions.

Figure 9A:
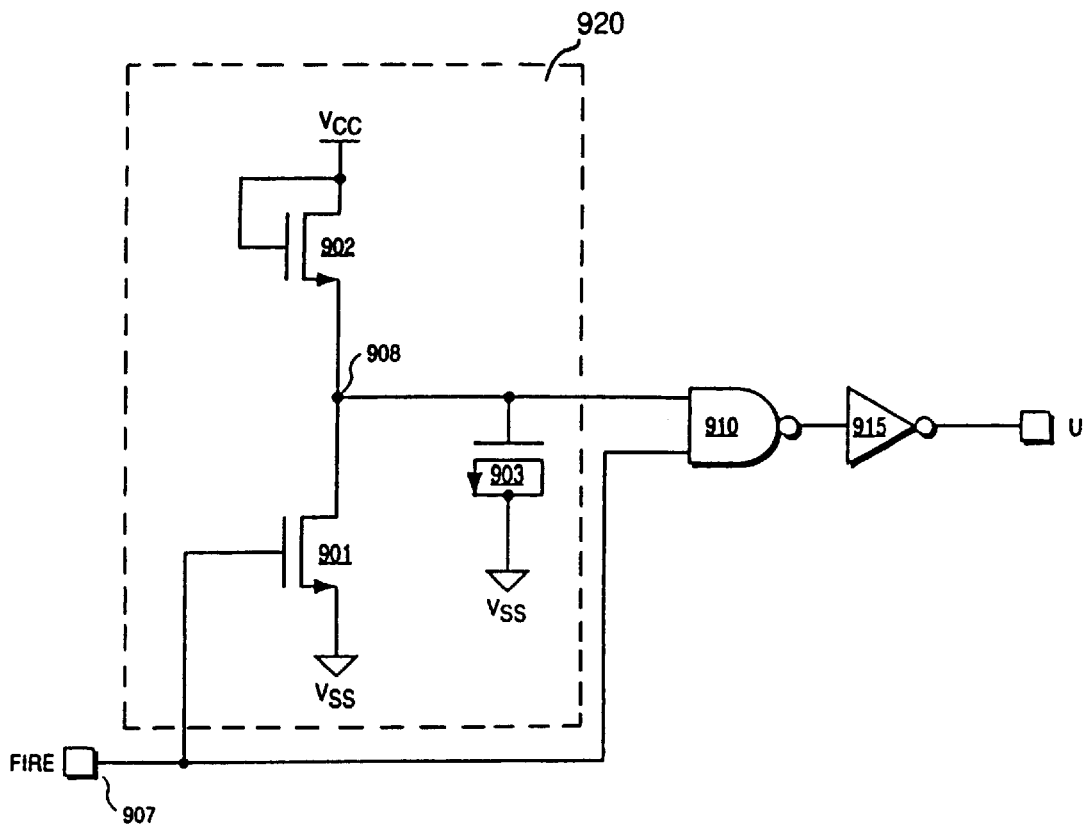
FIG. 9A shows one embodiment of the NMOS one-shot circuit of FIG. 7.

FIG. 9A shows NMOS one-shot circuit 701 according to one embodiment. NMOS one-shot circuit 701 includes a circuit 920 that provides a signal for one input of NAND gate 910 in response to the FIRE signal. There may be one or more circuits like circuit 920 coupled in series to provide an appropriate delay to the FIRE signal. Circuit 920 includes n-channel transistors 901–903, NAND gate 910, and inverter 915. An input node 907 is coupled to receive the FIRE signal. The input node 907 is also coupled to the gate of transistor 901 and to one input of NAND gate 910. The other input of NAND gate 910 is coupled to node 908. Transistor 902 is diode-connected for biasing node 908 to a logic high value when switching transistor 901 is switched off. Transistor 903 is configured as an MOS capacitor. Together, transistors 901–903 determine the rate at which node 908 is charged and discharged. Larger than nominal device sizes for transistors 901–903 will slow the rates of charging and discharging at node 908 because of the increased capacitance of transistor 903. Thus, it may be seen that output waveform U depends entirely on the NMOS process.

Figure 9B:
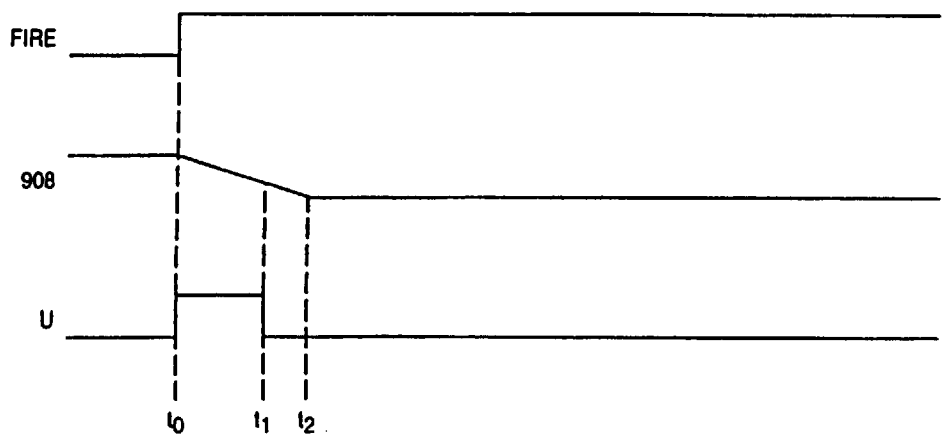
FIG. 9B is a timing diagram that illustrates one embodiment for the manner of operation of NMOS one-shot circuit of FIG. 9A.

FIG. 9B shows the operation of NMOS one-shot circuit 701. At time t0, the FIRE signal transitions from a low level to a high level which causes output waveform U to be asserted to a high level. The voltage on node 908 starts to drop towards $V_{SS}$ as the charge stored on transistor 903 discharges through transistor 901. At time t1, the voltage on node 908 reaches the trip point of NAND gate 910, and output waveform U is deasserted, or drops to a low level. At time t2, node 908 is fully discharged to $V_{SS}$.

Figure 10A:
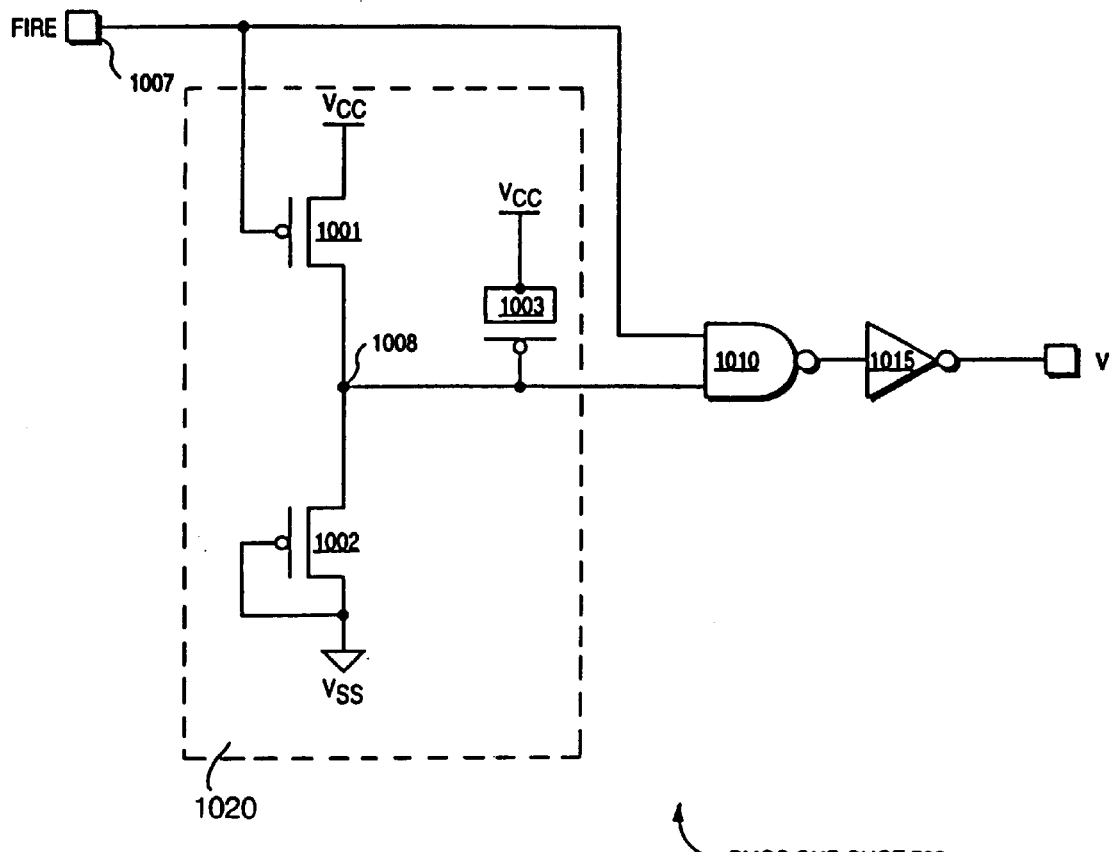
FIG. 10A shows one embodiment of the PMOS one-shot circuit of FIG. 7.

FIG. 10A shows a PMOS one-shot circuit 702 of one embodiment in more detail. PMOS one-shot circuit 702 includes a circuit 1020 that provides a signal for one input of NAND gate 1010 in response to the FIRE signal. There may be one or more circuits like circuit 1020 coupled in series to provide an appropriate delay to the FIRE signal. Circuit 1020 includes transistors 1001–1003, NAND gate 1010, and inverter 1015. Transistors 1001–1003 are all PMOS transistors and operate substantially like transistors 901–903 of NMOS one-shot circuit 701. Thus, it may be seen that the charging and discharging of node 1008 and the output waveform V depends entirely on the PMOS process.

Figure 10B:
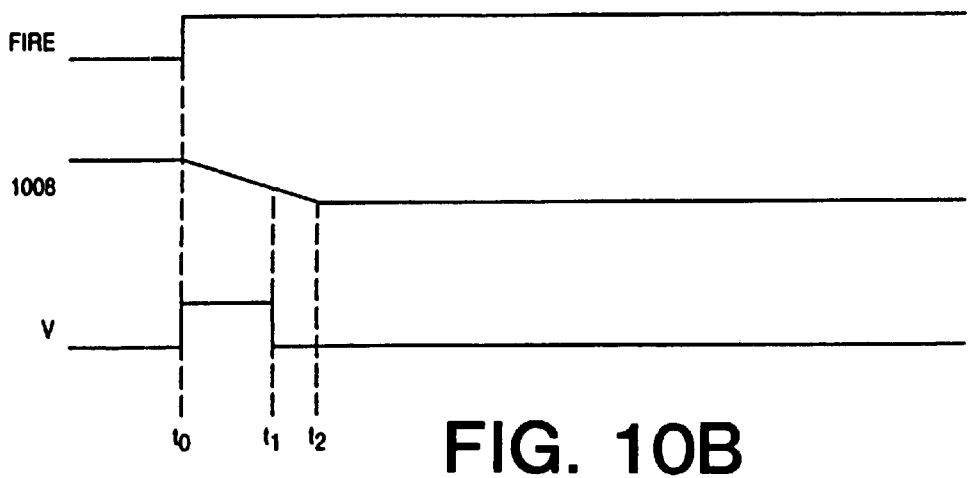
FIG. 10B is a timing diagram that illustrates one embodiment for the manner of operation of PMOS one-shot circuit of FIG. 10A.

FIG. 10B shows the operation of PMOS one-shot circuit 702. At time t0, the FIRE signal transitions from a low level to a high level which causes output waveform V to be asserted to a high level. The voltage on node 1008 starts to drop towards $V_{SS}$ as the charge stored on transistor 1003 discharges through transistor 1002. At time t1, the voltage on node 1008 reaches the trip point of NAND gate 1010, and output waveform V is deasserted, or drops to a low level. At time t2, node 1008 is fully discharged to $V_{SS}$.

Figure 11A:
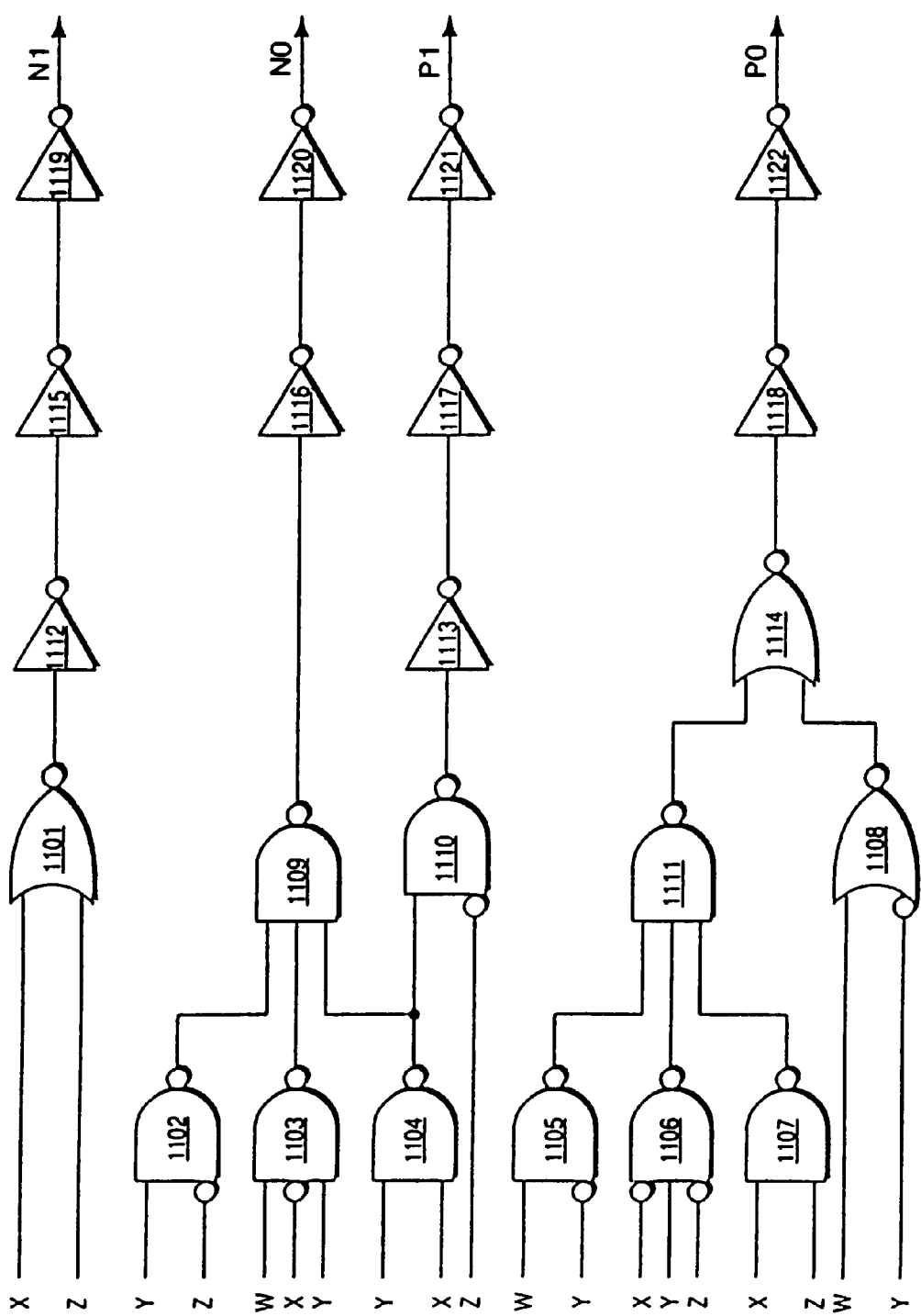
FIG. 11A shows combinational logic 710 according to one embodiment.

As previously described combinational logic 710 may re-map certain PVT codes to different SRC codes in response to PVT operating conditions previously determined to cause undesirable PVT codes. FIG. 11A shows one embodiment of combinational logic 710 for mapping PVT codes generated under particular PVT operating conditions to desired SRC codes based on simulation data. Combinational logic 710 of FIG. 11A is shown as including NOR gates 1101, 1108, and 1114, NAND gates 1102–1107 and 1109–1111, and inverters 1112–1113 and 1115 to 1122. The output signals W–Z of clocked comparators 703–706 are coupled to the logic gates as shown.

The SRC codes generated by the logic of FIG. 11A can be expressed by the following logic equations where the apostrophe symbol indicates an active low signal:

(1) N0=YZ'+XY+WX'Y'
(2) N1=X+Z
(3) P0'=W'Y+XZ+WY'+X'YZ'
(4) P1'=Z+XY

Table 1 summarize how the logic of FIG. 11A may be derived. Table 1 shows simulation conditions for PVT conditions including process (P), operating voltage (V), and temperature (T). For the process conditions, the first letter refers to fast (F), slow (S), or typical (T) NMOS process parameters, and the second letter refers to PMOS process parameters. First, optimal or desired SRC codes are determined for three-state inverters 225A and 225B based on simulated PVT conditions. These results are tabulated in columns four through seven. Second, the PVT codes generated by PVT code generator circuit 712 are simulated under the same PVT conditions. These results are summarized in columns eight through eleven. Then the logic can be readily designed to translate the PVT codes to the desired SRC codes or close to the SRC codes. The logic of FIG. 11A is tabulated in columns twelve through fifteen.

N1 having the same state as signal X. Inverters 1131 and 1135 generate N0 having the same state as signal W. Two-input NAND gate 1140 outputs P1 and has one input coupled to Z via inverters 1132 and 1136, and the other input coupled to the output of three-input NAND gate 1138. Three-input NAND gate 1138 has a first input coupled to the output of inverter 1130 to receive X', a second input coupled to W, a third input coupled to Y. Two-input NAND gate 1141 outputs P0 and has one input coupled to Y via inverters 1133 and 1137, and the other input coupled to the output of three-input NAND gate 1139. Three-input NAND gate 1139 has a first input coupled to the output of inverter 1130 to receive X', a second input coupled to the output of inverter 1131 to receive W', and a third input coupled to the output of inverter 1132 to receive Z'.

Figure 11B:
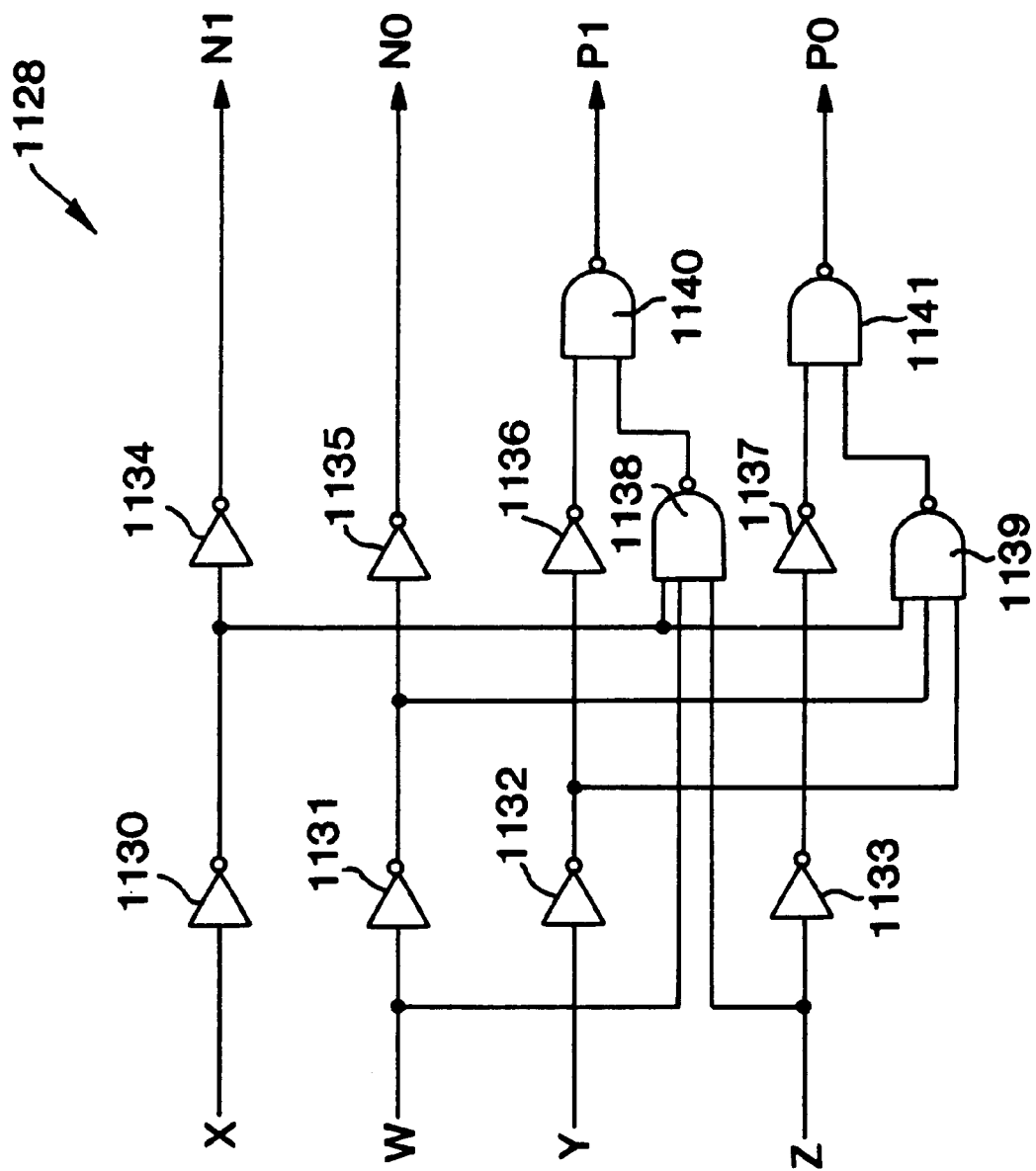
FIG. 11B shows combinational logic 710 according to another embodiment.

The SRC codes generated by the logic of FIG. 11B can be expressed by the following logic equations where the apostrophe symbol indicates an active low signal:

(1) N0=W
(2) N1=X

TABLE 1

| Simulation Conditions | | | Desired SRC Codes | | | | Simulated PVT Codes | | | | Actual SRC Codes | | | |
|---|---|---|---|---|---|---|---|---|---|---|---|---|---|---|
| P | V | T | N1 | N0 | P1 | P0 | X | W | Z | Y | N1 | N0 | P1 | P0 |
| FF | 3.3 V | 65° C. | 0 | 0 | 0 | 0 | 0 | 0 | 0 | 0 | 0 | 0 | 0 | 0 |
| FF | 2.9 V | 0° C. | 0 | 0 | 0 | 0 | 0 | 0 | 0 | 0 | 0 | 0 | 0 | 0 |
| FF | 2.9 V | 100° C. | 0 | 1 | 0 | 1 | 0 | 1 | 0 | 0 | 0 | 1 | 0 | 1 |
| FF | 3.7 V | 0° C. | 0 | 0 | 0 | 0 | 0 | 0 | 0 | 0 | 0 | 0 | 0 | 0 |
| FF | 3.7 V | 100° C. | 0 | 1 | 0 | 1 | 0 | 0 | 0 | 0 | 0 | 1 | 0 | 1 |
| FS | 3.3 V | 65° C. | 0 | 1 | 0 | 1 | 0 | 1 | 1 | 1 | 0 | 1 | 0 | 1 |
| FS | 2.9 V | 0° C. | 1 | 0 | 1 | 1 | 0 | 0 | 1 | 1 | 1 | 0 | 1 | 1 |
| FS | 2.9 V | 100° C. | 1 | 0 | 1 | 0 | 0 | 1 | 1 | 1 | 1 | 0 | 1 | 0 |
| FS | 3.7 V | 0° C. | 0 | 1 | 1 | 1 | 0 | 0 | 1 | 0 | 1 | 1 | 1 |
| FS | 3.7 V | 100° C. | 0 | 1 | 0 | 1 | 0 | 1 | 0 | 1 | 0 | 1 | 0 | 1 |
| TT | 3.3 V | 65° C. | 0 | 1 | 0 | 1 | 0 | 1 | 0 | 1 | 0 | 1 | 0 | 1 |
| TT | 2.9 V | 0° C. | 0 | 0 | 0 | 0 | 0 | 0 | 0 | 0 | 0 | 0 | 0 | 0 |
| TT | 2.9 V | 100° C. | 0 | 1 | 0 | 1 | 0 | 1 | 0 | 1 | 0 | 1 | 0 | 1 |
| TT | 3.7 V | 0° C. | 0 | 0 | 0 | 0 | 0 | 0 | 0 | 0 | 0 | 0 | 0 | 0 |
| TT | 3.7 V | 100° C. | 0 | 1 | 0 | 1 | 0 | 1 | 0 | 0 | 0 | 1 | 0 | 1 |
| SF | 3.3 V | 65° C. | 0 | 1 | 0 | 1 | 0 | 1 | 0 | 0 | 0 | 1 | 0 | 1 |
| SF | 2.9 V | 0° C. | 0 | 1 | 0 | 1 | 0 | 1 | 0 | 0 | 0 | 1 | 0 | 1 |
| SF | 2.9 V | 100° C. | 1 | 1 | 1 | 0 | 1 | 1 | 0 | 1 | 1 | 1 | 1 | 0 |
| SF | 3.7 V | 0° C. | 0 | 0 | 0 | 0 | 0 | 1 | 0 | 0 | 0 | 0 | 0 | 0 |
| SF | 3.7 V | 100° C. | 1 | 0 | 0 | 1 | 1 | 1 | 0 | 0 | 1 | 0 | 0 | 1 |
| SS | 3.3 V | 65° C. | 1 | 1 | 1 | 1 | 1 | 1 | 1 | 1 | 1 | 1 | 1 | 1 |
| SS | 2.9 V | 0° C. | 1 | 1 | 1 | 1 | 1 | 1 | 1 | 1 | 1 | 1 | 1 | 1 |
| SS | 2.9 V | 100° C. | 1 | 1 | 1 | 1 | 1 | 1 | 1 | 1 | 1 | 1 | 1 | 1 |
| SS | 3.7 V | 0° C. | 0 | 1 | 0 | 1 | 0 | 1 | 0 | 1 | 0 | 1 | 0 | 1 |
| SS | 3.7 V | 100° C. | 1 | 1 | 1 | 1 | 1 | 1 | 1 | 1 | 1 | 1 | 1 | 1 |

FIG. 11B illustrates combinational logic 1128 that is another embodiment of combinational logic 710. Combinational logic 1128 receives the PVT code signals W–Z and generates the SRC code signals N0, N1, P0, and P1. Combinational logic 1128 includes inverters 1130–1137, two-input NAND gates 1140 and 1141, and three-input NAND gates 1138 and 1139. Inverters 1130 and 1134 generate (3) P0=Y'+X'W'Z'
(4) P1=Z'+X'WY The logic of FIG. 11B may be generated is a similar fashion to that described above with respect to FIG. 11A and Table 1. Table 2 summarizes the data for generating the logic of FIG. 11B.

TABLE 2

| Simulation Conditions | | | Desired SRC Codes | | | | Simulated PVT Codes | | | | Actual SRC Codes | | | |
|---|---|---|---|---|---|---|---|---|---|---|---|---|---|---|
| P | V | T | N1 | N0 | P1 | P0 | X | W | Z | Y | N1 | N0 | P1 | P0 |
| FF | 3.3 V | 65° C. | 0 | 0 | 1 | 1 | 0 | 0 | 0 | 0 | 0 | 0 | 1 | 1 |
| FF | 2.9 V | 0° C. | 0 | 0 | 1 | 1 | 0 | 0 | 0 | 1 | 0 | 0 | 1 | 1 |
| FF | 2.9 V | 130° C. | 0 | 1 | 1 | 0 | 0 | 1 | 0 | 1 | 0 | 1 | 1 | 0 |

TABLE 2-continued

| Simulation Conditions | | | Desired SRC Codes | | | | Simulated PVT Codes | | | | Actual SRC Codes | | | |
|---|---|---|---|---|---|---|---|---|---|---|---|---|---|---|
| P | V | T | N1 | N0 | P1 | P0 | X | W | Z | Y | N1 | N0 | P1 | P0 |
| FF | 3.7 V | 0° C.   | 0 | 0 | 1 | 1 | 0 | 0 | 0 | 0 | 0 | 0 | 1 | 1 |
| FF | 3.7 V | 130° C. | 0 | 1 | 1 | 0 | 0 | 1 | 0 | 1 | 0 | 1 | 1 | 0 |
| FS | 3.3 V | 65° C.  | 0 | 1 | 1 | 0 | 0 | 1 | 1 | 1 | 0 | 1 | 1 | 0 |
| FS | 2.9 V | 0° C.   | 0 | 1 | 0 | 0 | 0 | 1 | 1 | 1 | 0 | 1 | 1 | 0 |
| FS | 2.9 V | 130° C. | 1 | 1 | 0 | 0 | 1 | 1 | 1 | 1 | 1 | 1 | 1 | 0 |
| FS | 3.7 V | 0° C.   | 0 | 0 | 1 | 0 | 0 | 0 | 0 | 1 | 0 | 0 | 1 | 1 |
| FS | 3.7 V | 130° C. | 0 | 1 | 1 | 0 | 0 | 1 | 1 | 1 | 0 | 1 | 1 | 0 |
| TT | 3.3 V | 65° C.  | 0 | 1 | 1 | 0 | 0 | 1 | 0 | 1 | 0 | 1 | 1 | 0 |
| TT | 2.9 V | 0° C.   | 0 | 1 | 1 | 0 | 1 | 1 | 1 | 1 | 0 | 1 | 1 | 0 |
| TT | 2.9 V | 130° C. | 1 | 1 | 0 | 0 | 0 | 1 | 1 | 1 | 1 | 1 | 0 | 0 |
| TT | 3.7 V | 0° C.   | 0 | 0 | 1 | 1 | 0 | 0 | 1 | 0 | 0 | 0 | 1 | 1 |
| TT | 3.7 V | 130° C. | 0 | 1 | 1 | 0 | 1 | 0 | 1 | 0 | 1 | 1 | 0 |
| SF | 3.3 V | 65° C.  | 0 | 1 | 1 | 1 | 0 | 1 | 0 | 0 | 0 | 1 | 1 | 1 |
| SF | 2.9 V | 0° C.   | 0 | 1 | 1 | 0 | 1 | 1 | 0 | 1 | 0 | 1 | 1 | 0 |
| SF | 2.9 V | 130° C. | 1 | 1 | 1 | 0 | 1 | 1 | 0 | 1 | 1 | 1 | 1 | 0 |
| SF | 3.7 V | 0° C.   | 0 | 0 | 1 | 1 | 0 | 0 | 0 | 0 | 0 | 0 | 1 | 1 |
| SF | 3.7 V | 130° C. | 0 | 1 | 1 | 1 | 0 | 1 | 0 | 0 | 0 | 1 | 1 | 1 |
| SS | 3.3 V | 65° C.  | 0 | 1 | 1 | 0 | 0 | 1 | 1 | 1 | 0 | 1 | 1 | 0 |
| SS | 2.9 V | 0° C.   | 1 | 1 | 0 | 0 | 1 | 1 | 1 | 1 | 1 | 1 | 0 | 0 |
| SS | 2.9 V | 130° C. | 1 | 1 | 0 | 0 | 1 | 1 | 1 | 1 | 1 | 1 | 0 | 0 |
| SS | 3.7 V | 0° C.   | 0 | 1 | 1 | 0 | 0 | 1 | 0 | 1 | 0 | 1 | 1 | 0 |
| SS | 3.7 V | 130° C. | 1 | 1 | 0 | 0 | 1 | 1 | 1 | 1 | 1 | 1 | 0 | 0 |

FIG. 12 illustrates slew rate indicator 1200 that is another embodiment of slew rate indicator 230 for controlling three-state inverters 225A and 225B shown in FIG. 6A. Slew rate indicator 1200 may also be considered a PVT detector that generates varying SRC code signals in response to changes in PVT operating conditions of a device or system containing bus driver circuit 200 and slew rate indicator 1200. Slew rate indicator 1200 may generate an SRC code for two three-state inverters or any number of three-state inverters coupled in parallel with inverter 215 of FIG. 2.

Slew rate indicator 1200 includes PVT code generator circuit 1230 and combinational logic 1210. As with PVT detector 712 of FIG. 7, PVT code generator circuit 1230 generates a PVT code as signals W–Z. Combinational logic 1210 interprets the PVT code of signals W–Z and generates a slew rate control (SRC) code as signals N0, N1, P0, and P1. Combinational logic 1210 may be referred to as a PVT code interpreter or an SRC code generator.

PVT code generator 1230 includes predrivers or tracking circuits 1232, 1234, 1236, and 1238. Any number of tracking circuit may be used in PVT code generator 1230. Each tracking circuit includes a tunable current source, a biasing transistor, and a comparator. For example, tracking circuit 1232 includes tunable current source 1222 sourcing current $I_{N0}$, n-channel biasing transistor 1202, and comparator 1212. Tracking circuit 1234 includes tunable current source 1224 sourcing current $I_{N1}$, n-channel biasing transistor 1204, and comparator 1214. Tracking circuit 1236 includes tunable current source 1226 sinking current $I_{P0}$, p-channel biasing transistor 1206, and comparator 1216. Tracking circuit 1238 includes tunable current source 1228 sinking current $I_{P1}$, p-channel biasing transistor 1208, and comparator 1218.

The tunable current sources are adjustable based on known circuit parameters (e.g., transistor sizes and process parameters) as well as likely operating conditions such that the tunable current sources may provide a constant current across changing PVT operating conditions as generally known in the art. For one embodiment, the tunable current sources may include a band gap reference circuit.

The tunable current sources may be tuned to correspond to the slowest transistors. Alternatively the tunable current sources may be tuned to correspond to the fastest transistors.

Typical constant currents may range from 50 $\mu$A to 250 $\mu$A. Additionally, the biasing voltages may be biased accordingly to emphasize one or more of the PVT conditions. For example, process and voltage variations may be emphasized or have more impact on the PVT code than temperature conditions.

The function of each of n-channel tracking circuits 1232 and 1234 may be illustrated with reference to tracking circuit 1232. When PVT conditions are fast relative to nominal PVT conditions, then the impedance of transistor 1202 decreases causing the voltage at node 1240 to decrease. When the voltage at node 1240 decreases to a value less than Vref, then comparator 1212 causes the W signal to have a low logic value. The low logic value of the W signal may be coupled to the N0 signal by combinational logic 1210 to disable n-channel transistor 610 in FIG. 6A from affecting the slew rate of the DRIVE or OUT signal. For one embodiment, Vref is VDD/2.

Similarly, when PVT conditions are slow relative to nominal PVT conditions, then the impedance of transistor 1202 increases causing the voltage at node 1240 to increase. When the voltage at node 1240 increases to a value greater than Vref, then comparator 1212 causes the W signal to have a high logic value. The high logic value of the W signal may be coupled to the N0 signal by combinational logic 1210 to enable n-channel transistor 610 in FIG. 6A to increase the slew rate of the DRIVE or OUT signal.

The function of each of p-channel tracking circuits 1236 and 1238 may be illustrated with reference to tracking circuit 1236. When PVT conditions are fast relative to nominal PVT conditions, then the impedance of transistor 1206 decreases causing the voltage at node 1244 to increase. When the voltage at node 1244 increases to a value greater than Vref, then comparator 1216 causes the Y signal to have a high logic value. The high logic value of the Y signal may be coupled to the P0 signal by combinational logic 1210 to disable p-channel transistor 605 in FIG. 6A from affecting the slew rate of the DRIVE or OUT signal.

Similarly, when PVT conditions are slow relative to nominal PVT conditions, then the impedance of transistor 1206 increases causing the voltage at node 1244 to decrease. When the voltage at node 1244 decreases to a value lower than Vref, then comparator 1216 causes the Y signal to have a low logic value. The low logic value of the Y signal may be coupled to the P0 signal by combinational logic 1210 to enable p-channel transistor 605 in FIG. 6A to increase the slew rate of the DRIVE or OUT signal.

The constant currents $I_{N0}$, $I_{N1}$, $I_{P0}$, and $I_{P1}$ may be equal to each other, or may be different. For example, $I_{N1}$ may source twice as much current as $I_{N0}$, and $I_{P1}$ may source twice as much current as $I_{P0}$. The criteria for setting constant currents $I_{N0}$, $I_{N1}$, $I_{P0}$, and $I_{P1}$ is to tune the outputs of the tracking circuits to switch at the appropriate PVT operating conditions.

For another embodiment, PVT code generator 1230 may use one, four, or any number of tracking circuits depending on the number of SRC codes signals required. For another embodiment, PVT codes on W–Z may be encoded by combinational logic 1210 to reduce the number of SRC control signals. For example, $2^N$ tracking circuits may be used to drive combinational logic 1210, where N represents the number of SRC codes. For this embodiment, a possible implementation of slew rate circuit 260 may include an array of N three-state predrivers 225. The array of N three-state pre-drivers may vary in strength/size in a geometric pattern to decode and utilize the encoded SRC codes.

It will be appreciated that a PVT operating condition corresponding to a nominal or typical slew rate for the DRIVE or OUT signal may correspond to inverter 215 being enabled and three-state inverters 225A and 225B being disabled. For another embodiment, the PVT operating condition corresponding to a nominal or typical slew rate for the DRIVE or OUT signal may correspond to inverter 215 being enabled and one of three-state inverters 225A or 225B being enabled (or either of their respective p-channel or n-channel transistors being enabled).

Combinational logic 1210 performs a similar function as combinational logic 710 of FIG. 7, that is, combinational logic 1210 may re-map PVT codes to desired SRC codes at different PVT operating conditions. Additionally, combinational logic 1210 may error-correct or eliminate undesirable PVT codes, and combinational logic 1210 may generate SRC codes that affect the duty cycle of the DRIVE or OUT signal. One embodiment of combinational logic 1210 is illustrated in FIG. 13.

Figure 13:
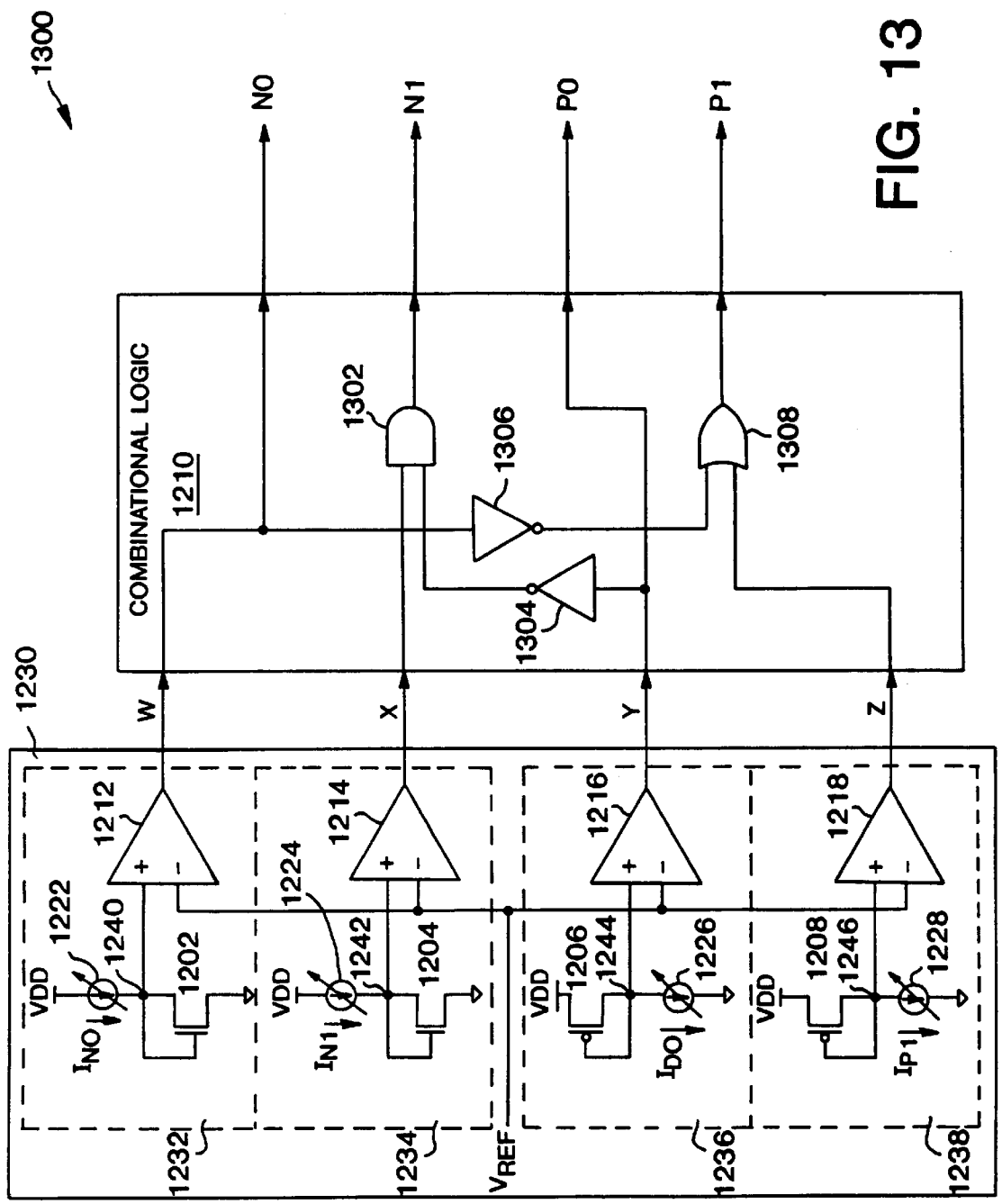
FIG. 13 shows one embodiment of the combinational logic of FIG. 12.

Combinational logic 1210 of FIG. 13 includes AND gate 1302, inverters 1304 and 1306, and OR gate 1308. AND gate 1302 outputs the N1 signal in response to the X signal and the inverted Y signal received from inverter 1304. OR gate 1308 outputs the P1 signal in response to the Z signal and the inverted W signal output from inverter 1306.

Combinational logic 1210 may be used in conjunction with three-state inverters 225C and 225D illustrated in FIG. 6B. Three-state inverters 225C and 225D are configured in a similar fashion as three-state inverters 225A and 225B of FIG. 6A with one exception: three-state inverter 225C has the drain of transistor 615 coupled to the drain of transistor 620, and three-state inverter 225D has the drain of transistor 635 coupled to the drain of transistor 640. Due to this configuration, three-state inverter 225C has the characteristic operation of increasing the slew rate of both the rising and falling slew rates of the DRIVE signal when N0 is asserted to a high voltage or when P0 is asserted to a low voltage. For example, when N0 is asserted to a high voltage, transistor 610 is conducting and will increase the rising and falling edge slew rates of the DRIVE signal at node 601. Transistor 610 may increase the falling edge slew rate to a greater degree than the rising edge slew rate. Transistor 605 operates in a similar fashion. Similarly, three-state inverter 225D has the characteristic operation of increasing the slew rate of both the rising and falling edges of the DRIVE signal when signal N1 is asserted to a high voltage or when P1 is asserted to a low voltage.

Combinational logic 1210 may error-correct or re-map undesirable PVT codes generated by PVT code generator 1230. A summary of the re-mapped PVT codes is illustrated in Tables 3 and 4. The re-mapping may be useful to limit maximum slew rates. For example, when PVT operating conditions are such that the DRIVE signal has a slow rising slew rate and a fast falling slew rate, then the PVT code generated on W–Z may be 1111. Without SRC code re-mapping by combinational logic 1210, the SRC code signals N0, N1, P0, and P1 are also 1111, and three-state inverters 225C and 225D increase the slow rising slew rate, but also have the undesired effect of increasing the fast falling slew rate (to a lesser degree). Re-mapping the SRC codes signals N0, N1, P0, and P1 to 1011, respectively, still increases the slow rising slew rate, but limits the increase of the already fast falling slew rate of the DRIVE signal.

Table 3 shows a summary of simulated PVT operating conditions and at various PVT conditions similar to Tables 1 and 2. As in Tables 1 and 2, the process (P) column has the NMOS process parameters listed first as fast (F), slow (S), or typical (T), and the PMOS process parameters listed second. The "Actual SRC Codes" are the SRC codes generated by combinational logic 1210 of FIG. 13.

TABLE 3

| Simulation Conditions | | | Simulated PVT Codes | | | | Actual SRC Codes | | | |
| --- | --- | --- | --- | --- | --- | --- | --- | --- | --- | --- |
| P | V | T | N0 | N1 | P0 | P1 | N0 | N1 | P0 | P1 |
| SS | 3.0 V | 110° C. | 1 | 1 | 0 | 0 | 1 | 1 | 0 | 0 |
| SS | 3.0 V | 0° C. | 1 | 1 | 0 | 0 | 1 | 1 | 0 | 0 |
| SS | 3.3 V | 110° C. | 1 | 1 | 0 | 0 | 1 | 1 | 0 | 0 |
| SS | 3.3 V | 0° C. | 1 | 1 | 0 | 0 | 1 | 1 | 0 | 0 |
| SS | 3.6 V | 110° C. | 1 | 0 | 0 | 1 | 1 | 0 | 0 | 1 |
| SS | 3.6 V | 0° C. | 1 | 0 | 0 | 1 | 1 | 0 | 0 | 1 |
| TT | 3.0 V | 110° C. | 1 | 0 | 0 | 1 | 1 | 0 | 0 | 1 |
| TT | 3.0 V | 0° C. | 1 | 0 | 0 | 1 | 1 | 0 | 0 | 1 |
| TT | 3.3 V | 110° C. | 1 | 0 | 0 | 1 | 1 | 0 | 0 | 1 |
| TT | 3.3 V | 0° C. | 1 | 0 | 0 | 1 | 1 | 0 | 0 | 1 |
| TT | 3.6 V | 110° C. | 1 | 0 | 0 | 1 | 1 | 0 | 0 | 1 |
| TT | 3.6 V | 0° C. | 0 | 0 | 1 | 1 | 0 | 0 | 1 | 1 |
| FF | 3.0 V | 110° C. | 0 | 0 | 1 | 1 | 0 | 0 | 1 | 1 |
| FF | 3.0 V | 0° C. | 0 | 0 | 1 | 1 | 0 | 0 | 1 | 1 |
| FF | 3.3 V | 110° C. | 0 | 0 | 1 | 1 | 0 | 0 | 1 | 1 |
| FF | 3.3 V | 0° C. | 0 | 0 | 1 | 1 | 0 | 0 | 1 | 1 |
| FF | 3.6 V | 110° C. | 0 | 0 | 1 | 1 | 0 | 0 | 1 | 1 |
| FF | 3.6 V | 0° C. | 0 | 0 | 1 | 1 | 0 | 0 | 1 | 1 |
| SF | 3.0 V | 110° C. | 1 | 1 | 1 | 1 | 1 | 0 | 1 | 1 |
| SF | 3.0 V | 0° C. | 1 | 1 | 1 | 1 | 1 | 0 | 1 | 1 |
| SF | 3.3 V | 110° C. | 1 | 1 | 1 | 1 | 1 | 0 | 1 | 1 |
| SF | 3.3 V | 0° C. | 1 | 1 | 1 | 1 | 1 | 0 | 1 | 1 |
| SF | 3.6 V | 110° C. | 1 | 1 | 1 | 1 | 1 | 0 | 1 | 1 |
| SF | 3.6 V | 0° C. | 1 | 1 | 1 | 1 | 1 | 0 | 1 | 1 |
| FS | 3.0 V | 110° C. | 0 | 0 | 0 | 0 | 0 | 0 | 0 | 1 |
| FS | 3.0 V | 0° C. | 0 | 0 | 0 | 0 | 0 | 0 | 0 | 1 |
| FS | 3.3 V | 110° C. | 0 | 0 | 0 | 0 | 0 | 0 | 0 | 1 |
| FS | 3.3 V | 0° C. | 0 | 0 | 0 | 0 | 0 | 0 | 0 | 1 |
| FS | 3.6 V | 110° C. | 0 | 0 | 0 | 0 | 0 | 0 | 0 | 1 |
| FS | 3.6 V | 0° C. | 0 | 0 | 0 | 0 | 0 | 0 | 0 | 1 |

As previously discussed, combinational logic 1210 error-corrects or eliminates several possible SRC codes. The eliminated codes may be found not to occur in a particular process, or may determined not to be useful or may even have undesirable effects upon the slew rate of the DRIVE or OUT signal (e.g., increasing the slew rate of one edge of the DRIVE or OUT signal too much etc.). For example, Table 3 illustrates that the fast n-channel/slow p-channel process operating conditions have been error-corrected to fast n-channel/typical p-channel SRC codes. Furthermore, Table 3 illustrates that the slow n-channel/fast p-channel process operating conditions have been error-corrected to typical n-channel/fast p-channel SRC codes.

Any SRC code may be mapped out for a given slew rate indicator given the intended PVT conditions and desired slew rate adjustments to the DRIVE or OUT signal.

Figure 14A:
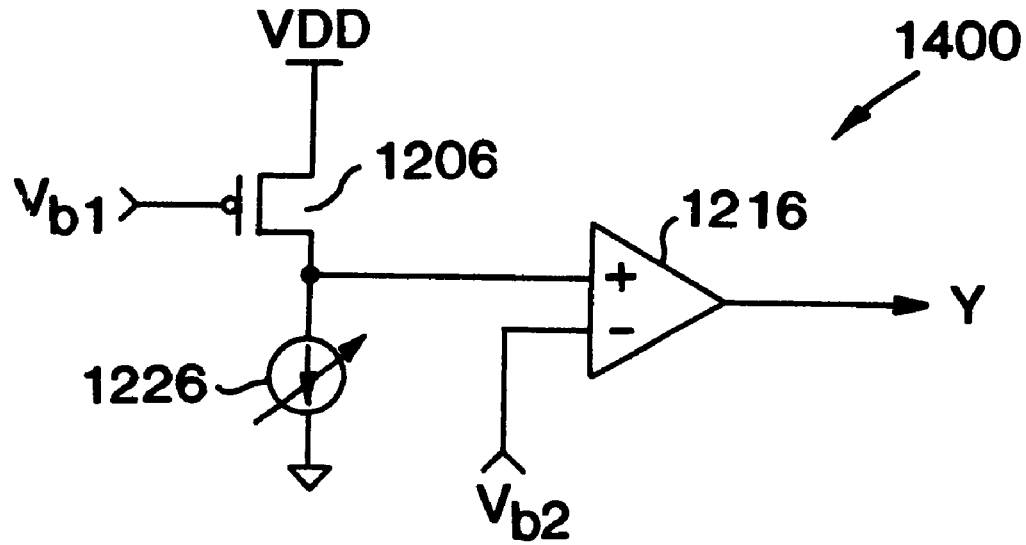
FIG. 14A shows one embodiment of a tracking circuit having biasing voltages.

FIGS. 14A illustrates tracking circuit 1400 which is an alternative embodiment for tracking circuit 1236. In this embodiment, the p-channel transistor 1206 is no longer configured as a diode; rather, its gate is coupled to a biasing voltage Vb1. Additionally, comparator 1216 has its inverted input coupled to another biasing voltage Vb2 and not Vref. The biasing voltages may be selected to produce a desired state to emphasize a particular PVT operating conditions. The biasing voltages may be determined through characterization or simulation of actual or anticipated PVT operating conditions. The biasing voltage may be selected to bias biasing transistor 1206 in a linear or saturation region of operation.

Figure 14B:
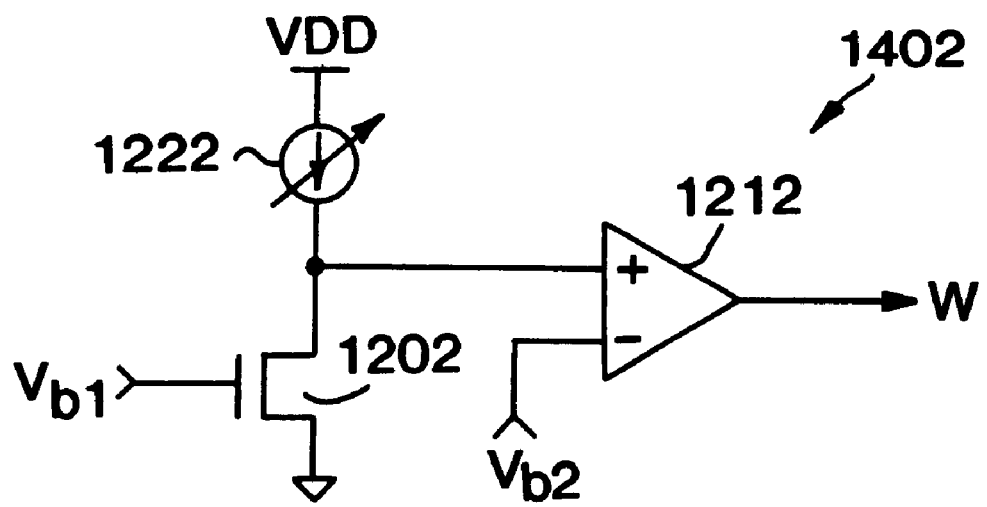
FIG. 14B shows another embodiment of a tracking circuit having biasing voltages.

FIG. 14B similarly illustrates tracking circuit 1402 which is an alternative embodiment or tracking circuit 1232. In this embodiment, the n-channel transistor 1202 is no longer configured as a diode; rather, its gate is coupled to biasing voltage Vb1. Additionally, comparator 1212 has its inverted input coupled to another biasing voltage Vb2 and not Vref. The biasing voltages may be selected to produce a desired state to emphasize a particular PVT operating conditions. The biasing voltages may be determined through characterization or simulation of actual or anticipated PVT operating conditions. The biasing voltage may be selected to bias biasing transistor 1202 in a linear or saturation region of operation.

Table 4 summarizes one embodiment of the SRC codes generated by slew rate indicator 1200 when tracking circuits 1232 and 1234 are replaced with tracking circuit 1402 of FIG. 14B having Vb1=2VDD/3 and Vb2=VDD. Additionally tracking circuits 1236 and 1238 are replaced with tracking circuit 1400 of FIG. 14A having Vb1=VDD/3 and Vb2=ground. The combinational logic for combinational logic 1210 may be readily determined from Table 4. Furthermore, the error-corrected SRC codes are readily determined from Table 4.

TABLE 4

| Simulation Conditions | | | Simulated PVT Codes | | | | Actual SRC Codes | | | |
|---|---|---|---|---|---|---|---|---|---|---|
| P | V | T | N0 | N1 | P0 | P1 | N0 | N1 | P0 | P1 |
| SS | 3.0 V | 110° C. | 1 | 1 | 0 | 0 | 1 | 1 | 0 | 0 |
| SS | 3.0 V | 0° C. | 1 | 1 | 0 | 0 | 1 | 1 | 0 | 0 |
| SS | 3.3 V | 110° C. | 1 | 1 | 0 | 0 | 1 | 1 | 0 | 0 |
| SS | 3.3 V | 0° C. | 1 | 0 | 0 | 1 | 1 | 0 | 0 | 1 |
| SS | 3.6 V | 110° C. | 1 | 0 | 0 | 1 | 1 | 0 | 0 | 1 |
| SS | 3.6 V | 0° C. | 1 | 0 | 0 | 1 | 1 | 0 | 0 | 1 |
| TT | 3.0 V | 110° C. | 1 | 1 | 0 | 0 | 1 | 1 | 0 | 0 |
| TT | 3.0 V | 0° C. | 1 | 0 | 0 | 1 | 1 | 0 | 0 | 1 |
| TT | 3.3 V | 110° C. | 1 | 0 | 0 | 1 | 1 | 0 | 0 | 1 |
| TT | 3.3 V | 0° C. | 1 | 0 | 0 | 1 | 1 | 0 | 0 | 1 |
| TT | 3.6 V | 110° C. | 1 | 0 | 0 | 1 | 1 | 0 | 0 | 1 |
| TT | 3.6 V | 0° C. | 0 | 0 | 1 | 1 | 0 | 0 | 1 | 1 |
| FF | 3.0 V | 110° C. | 1 | 0 | 0 | 1 | 1 | 0 | 0 | 1 |
| FF | 3.0 V | 0° C. | 0 | 0 | 1 | 1 | 0 | 0 | 1 | 1 |
| FF | 3.3 V | 110° C. | 1 | 0 | 0 | 1 | 1 | 0 | 0 | 1 |
| FF | 3.3 V | 0° C. | 0 | 0 | 1 | 1 | 0 | 0 | 1 | 1 |
| FF | 3.6 V | 110° C. | 0 | 0 | 1 | 1 | 0 | 0 | 1 | 1 |
| FF | 3.6 V | 0° C. | 0 | 0 | 1 | 1 | 0 | 0 | 1 | 1 |
| SF | 3.0 V | 110° C. | 1 | 1 | 0 | 1 | 1 | 1 | 1 | 0 |
| SF | 3.0 V | 0° C. | 1 | 1 | 1 | 1 | 1 | 0 | 1 | 1 |
| SF | 3.3 V | 110° C. | 1 | 0 | 0 | 1 | 1 | 1 | 0 | 1 |
| SF | 3.3 V | 0° C. | 1 | 0 | 1 | 1 | 1 | 0 | 0 | 1 |
| SF | 3.6 V | 110° C. | 1 | 0 | 1 | 1 | 1 | 0 | 1 | 1 |
| SF | 3.6 V | 0° C.. | 1 | 0 | 1 | 1 | 1 | 0 | 1 | 1 |
| FS | 3.0 V | 110° C. | 1 | 0 | 0 | 1 | 1 | 0 | 0 | 1 |
| FS | 3.0 V | 0° C. | 0 | 0 | 0 | 0 | 0 | 0 | 0 | 1 |
| FS | 3.3 V | 110° C. | 1 | 0 | 0 | 1 | 1 | 0 | 0 | 1 |
| FS | 3.3 V | 0° C. | 0 | 0 | 0 | 1 | 0 | 0 | 0 | 1 |
| FS | 3.6 V | 110° C. | 0 | 0 | 0 | 1 | 0 | 0 | 0 | 1 |
| FS | 3.6 V | 0° C. | 0 | 0 | 0 | 1 | 0 | 0 | 0 | 1 |

The relationship of PVT operating conditions to the function of tracking circuits 1232–1238 and 1400–1402 may be described as follows. Recall that the slew rate of the OUT signal is a strong function of the slew rate of the DRIVE signal, and the slew rate of the DRIVE signal is proportional to the switching delay of three-state inverter 225 driving the fixed load of output buffer 220. This can be approximated as an RC charging problem as shown in FIG. 16.

Figure 16:
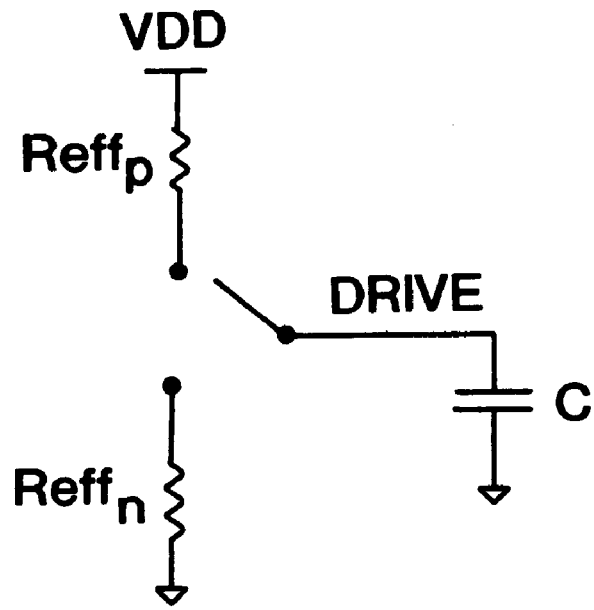
FIG. 16 shows one embodiment of an equivalent circuit of three-state inverter 225 and output buffer 220.

FIG. 16 illustrates an equivalent circuit of three-state inverter 225 having a resistance Reffp representing resistance due to PMOS transistors, and a resistance Reffn representing resistance due to NMOS transistors. Additionally, output buffer 220 is represented as a capacitive load C. The slew rate of the DRIVE signal for the equivalent circuit may be proportional to 1/Tp, where Tp is the switching delay of the equivalent circuit of three-state inverter 225. Tp may be expressed as Ieff/(C*Vswing), where Ieff is the current flowing through Reffp or Reffn, and Vswing is the voltage swing of the DRIVE signal. Ieff/Vswing may be expressed as GMeff, where GMeff is the effective large signal conductance of three-state inverter 225. GMeff may be approximated with the DC measurement Vds/Ibias such that the slew rate of the DRIVE signal may approximately equal Ibias/(C*Vds).

In tracking circuits 1232 and 1400, Ibias is the bias current of the devices (e.g., $I_{N0}$ or $I_{P0}$) which is set by constant current sources 1222 and 1226, respectively such that the slew rate of the DRIVE signal is proportional to Vds of the biasing devices (i.e., elements 1202 and 1206).

Figure 17:
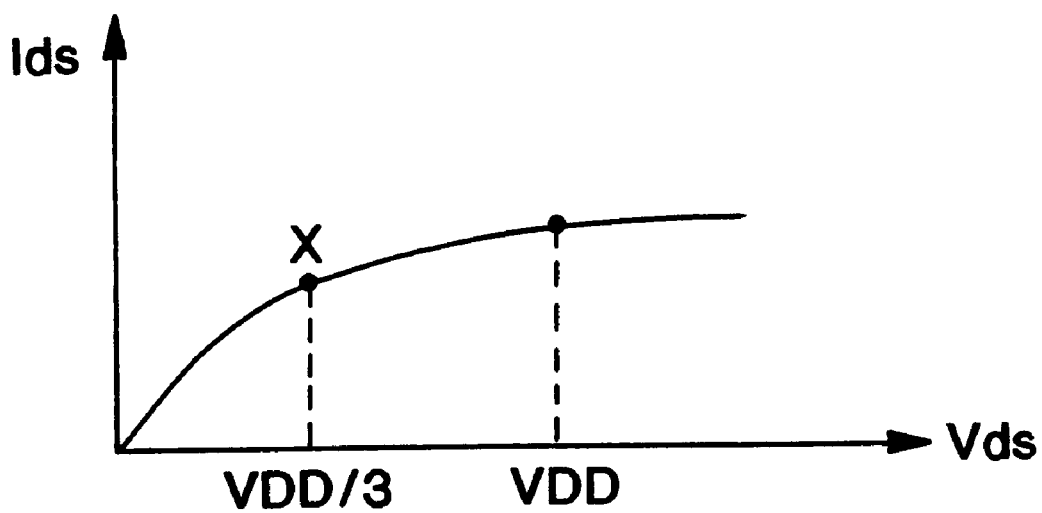
FIG. 17 shows a NMOS transistor curve of Ids v. Vds.

By setting biasing voltage Vb1 and comparator voltage Vb2 appropriately, the conductance of biasing transistor 1202 may be measured at a region that most correlates with slew rate. For example, in tracking circuit 1402, the voltage level on Vb1 can be set to VDD, and Vb2 can be set to VDD/3 to measure the conductance of biasing element 1202 as it switches between the linear and saturation mode of operation. This conductance value represents the average conductance of the biasing element throughout a normal transition from Vds=VDD to Vds=0 V. This is illustrated in the NMOS transistor IV curve illustrated in FIG. 17 where point X represents the average transconductance of the device over the Vds transition range from VDD to 0 volts.

According to well-known semiconductor theory, the voltage/current characteristics of a semiconductor MOSFET device is approximated by:

$$Id = \mu Cox(W/L)[(Vgs-Vt)Vds-(Vds^2/2)] \text{ for } Vds<Vgs-Vt \quad \text{(Eq.1)}$$

$$Id = [(\mu Cox(W/L))/2][(Vgs-Vt)^2] \text{ for } Vds>Vgs-Vt \quad \text{(Eq.2)}$$

For diode connected biasing element 1202 of FIG. 1200:

$$Idiode = \mu Cox(W/L)[(Vds-Vt)^2] \quad \text{(Eq.3)}$$

For the above equations: Id is the drain current; Vgs is the voltage difference between the gate and source of a transistor; Vds is the voltage difference between the drain and source of a transistor; $\mu$ is the mobility of carriers which is a function of PVT conditions; Cox is oxide capacitance which is a function of process parameters; (W/L) is the width/length of a transistor which is a function of process parameters; and Vt is the threshold voltage of a transistor which is a function of PVT conditions.

Each term in equations 1–3 has a different dependence on process, operating voltage, and temperature. By selecting biasing voltages Vb1 and Vb2 as in tracking circuits 1400 and 1402, each component of equations 1–3 may be weighted for a "best fit" to slew rate, or to emphasize one or more of the PVT effects. For example, diode connected biasing transistor 1202 results in:

$$Vds = \text{square root}((2/\mu Cox)(L/W)\text{Ibias}) - Vt \quad \text{(Eq.4)}$$

Since the mobility and threshold voltage are decreasing functions with temperature, it may be possible to find a Vds operating point where the temperature effects of mobility and threshold approximately cancel. The result is a low Vds variation with respect to temperature.

Similarly, it can be shown that a particular combination of biasing voltages Vb1 and Vb2 in tracking circuits 1400 and 1402 may attain similar Vds dependence on temperature.

The embodiments illustrated in FIGS. 12–14, as well as other embodiments disclosed herein, may include sampling circuitry that may sample the PVT codes or the SRC codes over time and produce a time-averaged PVT code or SRC code. Alternatively, the sampling circuit may select one of the sampled PVT or SRC codes. The sampling circuitry may be coupled between PVT code generator 1230 and combinational logic 1210 of FIG. 12, or may coupled after combinational logic 1230. The sampling circuitry may be integrated with PVT code generator 1230 or with combinational logic 1210. Averaging may reduce the chances or error due to power supply noise, glitches, and other non-optimal operating conditions.

Figure 15:
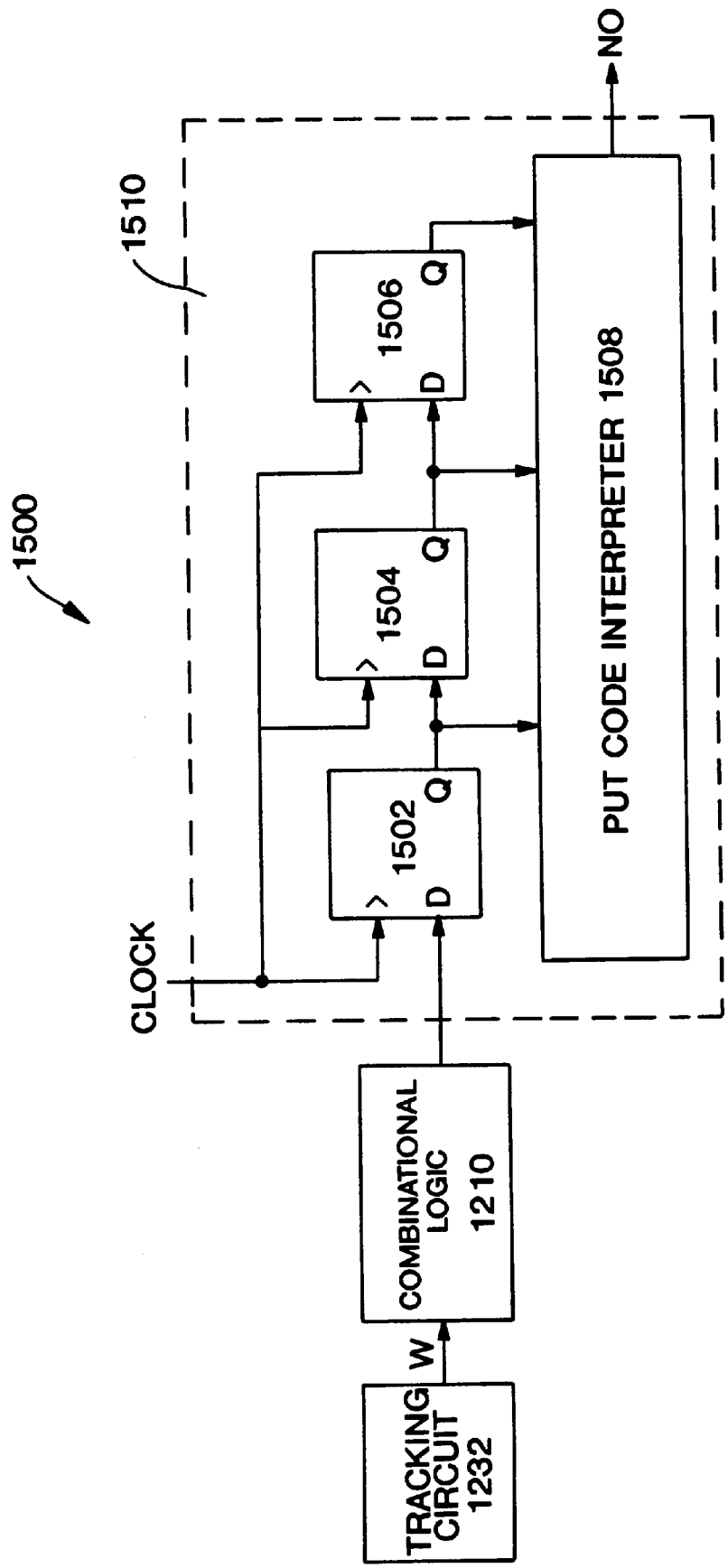
FIG. 15 shows one embodiment of a slew rate indicator circuit including sampling circuitry.

FIG. 15 illustrates one embodiment of slew rate indicator 1500 that generates one of the SRC code signals N0. Slew rate indicator 1500 includes tracking circuit 1232, combinational logic 1210, and sampling circuitry 1510. Sampling circuitry 1510 samples the SRC code generated by combinational logic 1210 and generates the final SRC code as signal N0.

Sampling circuitry 1510 includes three registers 1502, 1504 and 1506 each clocked by a clock signal. For other embodiments, any number of storage elements may be used. The D input of register 1502 is configured to receive the output of combinational logic 1210. The Q output of register 1502 is coupled to the D input of register 1504 and PVT code generator 1508. The Q output of register 1504 is coupled to the D input of register 1506 and PVT code generator 1508. The Q output of register 1506 is coupled to PVT code generator 1508. Register 1502 samples the output from combinational logic 1210 once per clock cycle. The samples are sequentially clocked to registers 1504 and 1506. PVT code generator 1508 may then select a particular Q output to provide as the SRC code signal N0, or PVT code generator 1508 may perform an averaging or other function upon the Q outputs of registers 1502, 1504, and 1506 in order to generate N0.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A driver circuit having a controlled slew rate, comprising:
    a first circuit having an input coupled to receive a data signal and an output operative to output a drive signal in response to the data signal;
    a second circuit coupled in parallel with the first circuit and operative to receive a slew rate control signal; and
    a slew rate indicator circuit coupled to the second circuit, the slew rate indicator circuit determining the state of the slew rate control signal in response to operating conditions that cause variations in the slew rate of the drive signal such that when the slew rate control signal is asserted, then the second circuit is enabled to affect the slew rate of the drive signal, wherein the slew rate indicator circuit comprises:
        a one-shot circuit operative to receive a clock signal, the one-shot circuit generating a pulse in response to a first transition of the clock signal; and
        a clocked comparator coupled to the one-shot circuit and operative to receive the pulse, the clocked comparator determining the state of the slew rate control signal by sampling for the presence of the pulse in response to a second transition of the clock signal.

2. The driver circuit of claim 1, wherein the slew rate control signal is asserted when the pulse is detected when the clocked comparator samples for the presence of the pulse, and the slew rate control signal is not asserted when the pulse is not detected when the clocked comparator samples for the presence of the pulse.

3. A driver circuit having a controlled slew rate comprising:
    a first circuit having an input coupled to receive a data signal and an output operative to output a drive signal in response to the data signal;
    a second circuit coupled in parallel with the first circuit and operative to receive a plurality of slew rate control signals; and
    a slew rate indicator circuit coupled to the second circuit, the slew rate indicator circuit determining the state of the plurality of slew rate controls signal in response to operating conditions that cause variations in the slew rate of the drive signal such that when the plurality of slew rate control signals are asserted, then the second circuit is enabled to affect the slew rate of the drive signal, and wherein the slew rate indicator circuit comprises:
        a plurality of pulse generator circuits coupled to receive a trigger signal, each of the pulse generator circuits generating a pulse in response to the trigger signal; and
        a plurality of clocked comparator circuits each coupled to receive one of the plurality of pulses and one of a plurality of sampling signals, wherein the clocked comparators circuits determine the state of the slew rate control signals by sampling for the presence of the plurality of pulses in response to the plurality of sampling signals.

4. The driver circuit of claim 3, wherein the plurality of sampling signals are asserted a predetermined time after the trigger signal is asserted.

5. The driver circuit of claim 3, wherein the plurality of clocked comparator circuits generate a plurality of code signals in response to sampling for the presence of the plurality of pulses, and wherein the slew rate indicator circuit further comprises a combinational logic circuit receiving the plurality of code signals and generating the plurality of slew rate control signals.

6. The driver circuit of claim 3, wherein one of the pulse generator circuits comprises a one-shot circuit.

7. The driver circuit of claim 6, wherein the one-shot circuit comprises a plurality of transistors, wherein each of the transistors is the same type of transistor.

8. A driver circuit having a controlled slew rate comprising:
   a first circuit having an input coupled to receive a data signal and an output operative to output a drive signal in response to the data signal;
   a second circuit coupled in parallel with the first circuit and operative to receive a plurality of slew rate control signals; and
   a slew rate indicator circuit coupled to the second circuit, the slew rate indicator circuit determining the state of the slew rate control signals in response to operating conditions that cause variations in the slew rate of the drive signal such that when the slew rate control signals are asserted, then the second circuit is enabled to affect the slew rate of the drive signal, the slew rate indicator circuit comprising a code generator having a plurality of tracking circuits that generate a code in response to changes in the operating conditions that cause variations in the slew rate of the drive signal, wherein each tracking circuit comprises:
      a current source coupled to a node;
      a biasing transistor coupled to the node; and
      a comparator having a first input coupled to the node and a second input coupled to a reference voltage, wherein the comparator outputs a bit of the code.

9. A method for controlling a slew rate of a driver signal of a driver circuit comprising;
   generating an active state and an inactive state of a pulse signal in response to a first transition of a trigger signal;
   comparing the pulse signal with a reference voltage a first predetermined time after the first transition of the trigger signal; and
   adjusting the slew rate of the driver signal when the pulse signal is in the active state at the first predetermined time after the first transition of the trigger signal.

10. The method of claim 9, further comprising the step of not adjusting the slew rate of the drive signal when the signal is in an inactive state at the first predetermined time after the first transition of the trigger signal.

11. The method of claim 9, wherein the comparing step comprises sampling the signal in response to a second transition of the trigger signal.

12. The method of claim 9, further comprising the steps of:
   generating a code signal in response to the comparing step; and
   translating the code signal into a slew rate control signal, wherein the adjusting step adjusts the slew rate of the driver signal in response to the slew rate control signal.

13. A method for controlling a slew rate of a driver signal of a driver circuit comprising:
   generating a pulse in response to a first transition of a trigger signal;
   sampling for the pulse at a first predetermined time after the first transition of the trigger signal; and
   adjusting the slew rate of the drive signal when the pulse is in a first state at the first predetermined time after the first transition of the trigger signal, and further adjusting a duty cycle of the drive signal.

14. A driver circuit having slew rate control comprising:
   a first drive circuit operative to output a drive signal;
   a pulse generator operative to generate a pulse in response to a first transition of a trigger signal;
   a comparator circuit having a first input and a second input, the first input for receiving the pulse from the pulse generator, and the second input coupled to a reference voltage, the comparator circuit operative to generate a slew rate control signal in response to comparing the signals at its first and second inputs; and
   a second drive circuit coupled to the first drive circuit and receiving the slew rate control signal from the comparator circuit, wherein the second drive circuit affects the slew rate of the drive signal in response to the slew rate control signal.

15. A process-voltage-temperature (PVT) detector circuit comprising:
   a pulse generator circuit operative to generate a pulse in response to a first transition of a clock signal; and
   a clocked comparator having a first input, a second input, and a third input, the first input for receiving the pulse from the pulse generator circuit, the second input coupled to a reference voltage, and the third input for receiving the clock signal, the clocked comparator configured to compare the signals at the first and second inputs and generate a control signal in response to a second transition of the clock signal, wherein the control signal indicates the PVT operating conditions of the PVT detector circuit.

16. A process-voltage-temperature (PVT) detector circuit comprising:
   a first pulse generator coupled to receive a trigger signal, the first pulse generator comprising an n-channel MOS transistor and configured to generate a first pulse having a pulse width determined by affects of PVT operating conditions on the n-channel MOS transistor;
   a second pulse generator coupled to receive the trigger signal, the second pulse generator comprising a p-channel MOS transistor and configured to generate a second pulse having a pulse width determined by affects of PVT operating conditions on the p-channel MOS transistor;
   a first comparator having first, second, and third inputs, the first input for receiving the first pulse from the first pulse generator, the second input coupled to a first reference voltage, and the third input coupled to a first sampling signal, the first comparator operative to compare the signals at the first and second input and generate a first control signal in response to the first sampling signal, wherein the first control signal indicates the affect of the PVT operating conditions on the n-channel MOS transistor; and
   a second comparator having first, second, and third inputs, the first input for receiving the second pulse from the second pulse generator, the second input coupled to a second reference voltage, and the third input coupled to a second sampling signal, the second comparator operative to compare the signals at the first and second input and generate a second control signal in response to the second sampling signal, wherein the second control signal indicates the affect of the PVT operating conditions on the p-channel MOS transistor.

17. The PVT detector circuit of claim 16, wherein the first and second reference voltages are the same reference voltage.

18. The driver circuit of claim 14, wherein the comparator circuit is operative to compare the signals at its first and second inputs in response to a second transition of the trigger signal.

* * * * *